United States Patent
Labrie et al.

(10) Patent No.: US 6,457,738 B1
(45) Date of Patent: Oct. 1, 2002

(54) INFLATABLE RESTRAINT APPARATUS

(75) Inventors: Craig B. Labrie, Dover, NH (US); Bruce A. Batchelder, Lee, NH (US); John D. Gray, Union, NH (US); Marie J. Hersman, Durham, NH (US)

(73) Assignee: Textron Automotive Company, Inc., Troy, MI (US)

(*) Notice: Subject to any disclaimer, the term of this patent is extended or adjusted under 35 U.S.C. 154(b) by 0 days.

(21) Appl. No.: 09/812,189

(22) Filed: Mar. 19, 2001

Related U.S. Application Data

(63) Continuation of application No. 09/557,784, filed on Apr. 18, 2000, which is a continuation-in-part of application No. 09/342,283, filed on Jun. 29, 1999, now Pat. No. 6,131,945, which is a continuation of application No. 08/949,842, filed on Oct. 14, 1997, now Pat. No. 5,941,558, which is a continuation-in-part of application No. 08/871,243, filed on Jun. 9, 1997, now abandoned, which is a continuation-in-part of application No. 09/334,075, filed on Jun. 16, 1999, now Pat. No. 6,203,056, which is a continuation-in-part of application No. 08/949,842, filed on Oct. 14, 1997, now Pat. No. 5,941,558, which is a continuation-in-part of application No. 08/871,243, filed on Jun. 9, 1997, now abandoned.

(51) Int. Cl.$^7$ .............................................. B60R 21/20
(52) U.S. Cl. ................................. 280/728.3; 280/732
(58) Field of Search .................... 280/728.3, 732, 280/752, 728.2, 730.1, 730.2, 728.1

(56) References Cited

U.S. PATENT DOCUMENTS

| | | |
|---|---|---|
| 2,781,203 A | 2/1957 | Kurilenko |
| 3,610,657 A | 10/1971 | Cole |
| 3,853,334 A | 12/1974 | Auman et al. |
| 4,810,005 A | 3/1989 | Fohl ............................ 280/732 |
| 4,893,833 A | 1/1990 | DiSalvo et al. |
| 5,072,967 A * | 12/1991 | Batchelder et al. .......... 280/731 |
| 5,176,400 A | 1/1993 | McGuire et al. .......... 280/728.2 |
| 5,290,059 A | 3/1994 | Smith et al. .............. 280/728.2 |
| 5,308,111 A * | 5/1994 | Sommer .................... 280/728.3 |
| 5,333,901 A * | 8/1994 | Barnes ........................ 280/732 |
| 5,447,327 A * | 9/1995 | Jarboe et al. ............. 280/728.3 |
| 5,458,364 A | 10/1995 | Mueller et al. |
| 5,511,818 A | 4/1996 | Jarboe et al. ............. 280/728.2 |
| 5,564,731 A | 10/1996 | Gallagher et al. ........ 280/728.3 |
| 5,569,959 A * | 10/1996 | Cooper et al. ........... 280/728.3 |
| 5,609,356 A | 3/1997 | Mossi |
| 5,641,177 A | 6/1997 | Berg et al. |
| 5,670,738 A | 9/1997 | Storey et al. ................ 102/530 |
| 5,687,986 A | 11/1997 | Nelsen et al. ............. 280/728.2 |
| 5,738,367 A * | 4/1998 | Zichichi et al. ........... 280/728.3 |
| 5,762,360 A | 6/1998 | Damman et al. ......... 280/728.2 |
| 5,772,241 A | 6/1998 | Heilig ......................... 280/731 |
| 5,845,928 A | 12/1998 | Nelsen et al. ............. 280/728.2 |
| 5,865,461 A * | 2/1999 | Totani et al. .............. 280/728.3 |
| 5,868,419 A * | 2/1999 | Taguchi et al. ........... 280/728.3 |
| 5,989,660 A | 11/1999 | Moriwaki et al. ......... 428/35.2 |
| 6,042,139 A | 3/2000 | Knox |

FOREIGN PATENT DOCUMENTS

| | | | |
|---|---|---|---|
| DE | 42 26 316 A1 * | 2/1994 | |
| JP | 58-38131 | 3/1983 | ........... B29D/27/04 |
| JP | 5-185896 | 7/1993 | ........... B60R/21/20 |
| JP | 6-227351 | 8/1994 | ........... B60R/21/20 |

* cited by examiner

Primary Examiner—Peter C. English
(74) Attorney, Agent, or Firm—Grossman, Tucker, Perreault & Pfleger, PLLC

(57) ABSTRACT

An inflatable restraint apparatus for an automotive vehicle includes an air bag deployment door formed in a trim panel. The air bag deployment door outer surface has an area of 5 in$^2$ to 35 in$^2$, and at least a portion of the perimeter comprises a frangible marginal edge. The frangible marginal edge includes a frangible length, and at least 20% of the frangible length is non-linear. The apparatus also includes an air bag dispenser containing an air bag having a volume of at least 90 liters. The air bag dispenser includes an elongated container having an air bag receptacle containing an air bag and an inflator receptacle containing an inflator.

36 Claims, 20 Drawing Sheets

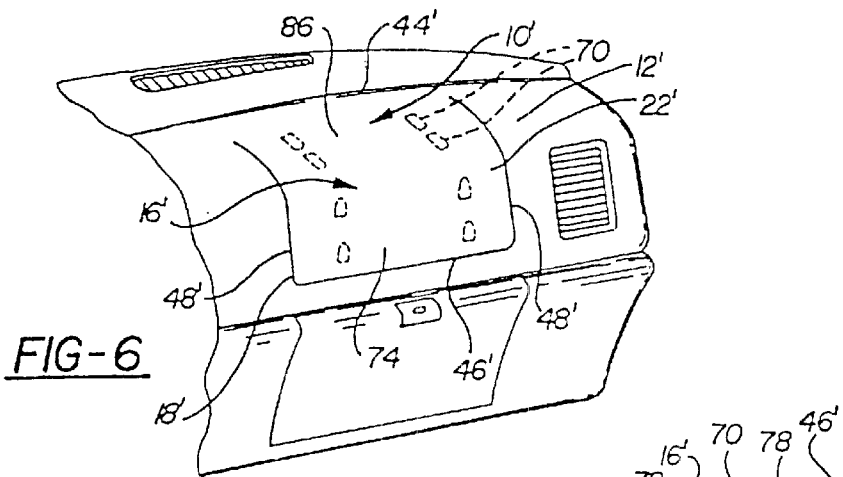
FIG-6
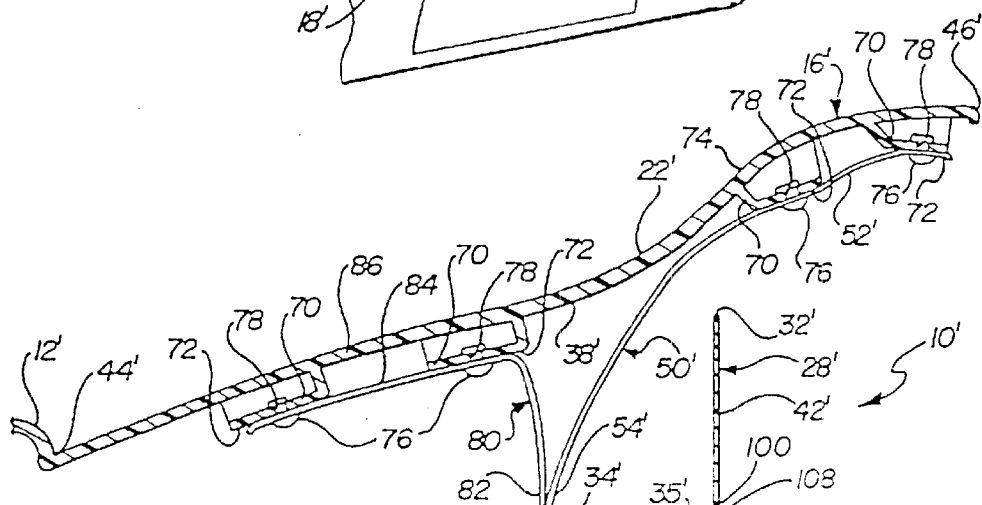
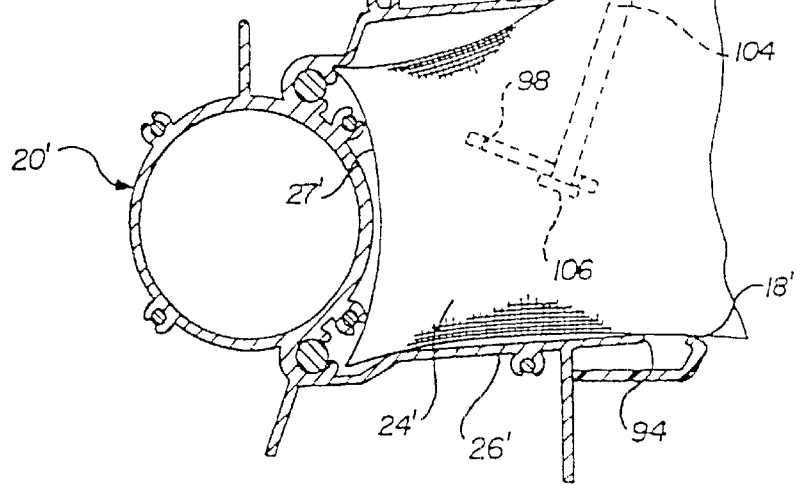
FIG-7

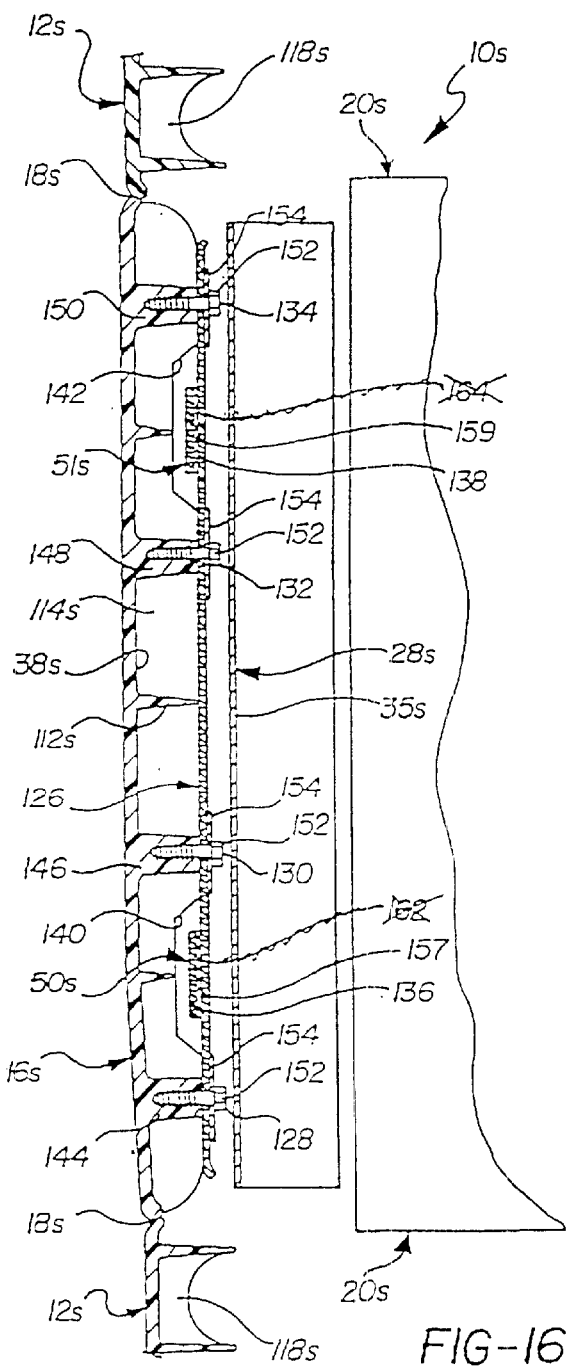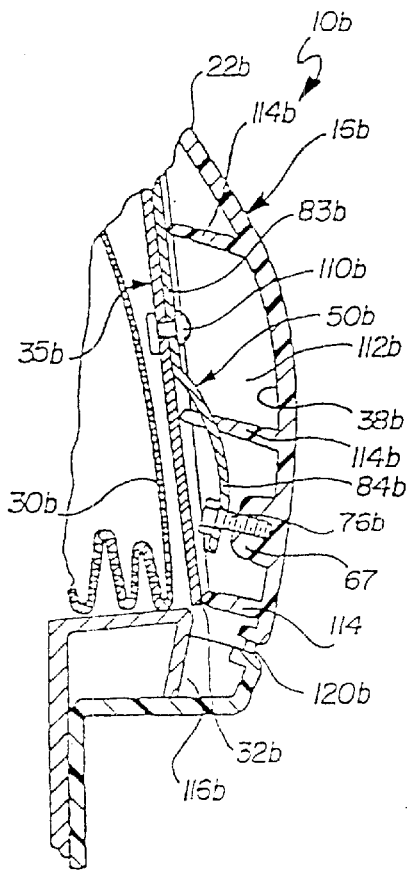
FIG-16
FIG-17

INFLATABLE RESTRAINT APPARATUS

This patent application is a continuation of application Ser. No. 09/557,784, filed Apr. 18, 2000, which is application Ser. No. 09/342,283 filed Jun. 29, 1999, U.S. Pat. No. 6,131,945, which is a continuation of application Ser. No. 08/949,842, filed Oct. 14, 1997, now U.S. Pat. No. 5,941,558, which is a continuation-in-part of application Ser. No. 08/871,243, filed Jun. 9, 1997, now abandoned. Patent application Ser. No. 09/551,784 is also a continuation-in-part of application Ser. No. 09/334,075, filed Jun. 16, 1999, U.S. Pat. No. 6,203,056, which is a continuation-in-part of application Ser. No. 08/949,842, filed Oct. 14, 1997, now U.S. Pat. No. 5,941,558, which is a continuation-in-part of application Ser. No. 08/871,243, filed Jun. 9, 1997, now abandoned.

TECHNICAL FIELD

This invention relates generally to an inflatable restraint apparatus having an air bag deployment door formed with a trim panel and, more particularly, to such an apparatus having a small size, low mass, and compact packaging.

BACKGROUND OF THE INVENTION

Inflatable restraint systems which protect non-driver front-seat passengers arc located in trim panels, such as instrument panels, located immediately in front of such passengers in a vehicle. These inflatable restraint systems make use of various tapes of air bag deployment doors through which an air bag exits the panel into the passenger compartment.

Some of these air bag deployment doors, because of their large size, make contact with the windshield upon deployment. If the windshield fractures or breaks, this can result in glass fragmentation entering the passenger compartment and possibly injuring occupants.

Still other air bag deployment doors have a high mass that requires a more powerful gas charge in order to deploy properly. The increased door mass and corresponding gas charge require more structure and added cost to adequately facilitate deployment. The added structure, if not property designed, may pose a hazard to vehicle occupants in the form of added fragmentation upon air bag deployment. Also, because of the high mass, the doors present an added hazard to out-of-position vehicle occupants who might be contacted by the door upon air bag deployment and suffer injury.

Still other inflatable restraint systems make use of an air bag dispenser with a rectangular air bag receptacle and a rectangular air bag dispenser opening. Such dispensers make use of a rectangular air bag receptacle to provide sufficient receptacle volume to contain an air bag of the size necessary for passenger-side protection. However, such dispensers take up considerable packaging space along the backside surface of the panel, thus limiting the number of possible locations for their incorporation.

It is believed that large air bag deployment doors and air bag dispensers have also been viewed by consumers and manufacturers alike as providing additional protection as a function of their size. In other words, a larger air bag deployment door is indicative of a larger air bag which will provide additional safety as compared to a smaller air bag deployment door which could only contain a smaller air bag.

What is needed is an inflatable restraint system having an air bag deployment door of small size, low mass, and compact packaging which addresses the aforementioned issues, and provides the same sized air bag that is associated with larger air bag deployment doors and air bag dispensers.

SUMMARY OF THE INVENTION

According to the invention, an inflatable restraint apparatus for an automotive vehicle is provided that comprises an air bag deployment door formed in a trim panel. The air bag deployment door outer surface has an outer surface area in the range between and including 5 $in^2$ to 35 $in^2$, and at least a portion of the perimeter comprises a frangible marginal edge. The apparatus also comprises an air bag dispenser containing an air bag having a volume of at least 90 liters. In this manner, an inflatable restraint apparatus is provided with an air bag deployment door of small size coupled with an air bag of sufficient volume to protect passenger-side front-seat occupants in the event of air bag deployment.

According to another aspect of the invention, an inflatable restraint apparatus for an automotive vehicle is provided that comprises an air bag deployment door formed in a trim panel. The air bag deployment door has a perimeter at least a portion of which comprises a frangible marginal edge. The frangible marginal edge comprises a frangible length wherein at least 20% of the frangible length is non-linear. In this manner, an inflatable restraint apparatus is provided with an air bag deployment door having a shape which makes tear propagation of the frangible marginal edge more predictable by eliminating sharp corners that can be truncated during air bag deployment.

According to another aspect of the invention, an air bag dispenser is provided that comprises an elongated container having an air bag receptacle containing an air bag and an inflator receptacle containing an inflator. In this manner, the air bag and inflator are provided in a single container with compact packaging.

BRIEF DESCRIPTION OF THE DRAWINGS

To better understand and appreciate the invention, refer to the following detailed description in connection with the accompanying drawings:

FIG. 6 is a fragmentary perspective view of the air bag door of FIG. 5 installed in a vehicle dash panel;

FIG. 7 is a cross-sectional end view of the passive restraint system of FIG. 4 during air bag inflation;

FIG. 8 is a cross sectional view of a heat-stake pin of the passive restraint system of FIGS. 1 and 2;

FIG. 16 is a cross-sectional view of the passive restraint system of FIG. 12 taken along line 16—16 of FIG. 14;

FIG. 17 is a partial cross-sectional view of the passive restraint system of FIGS. 9–11 including an alternative tether attachment construction;

DETAILED DESCRIPTION OF THE INVENTION

Figure 1:
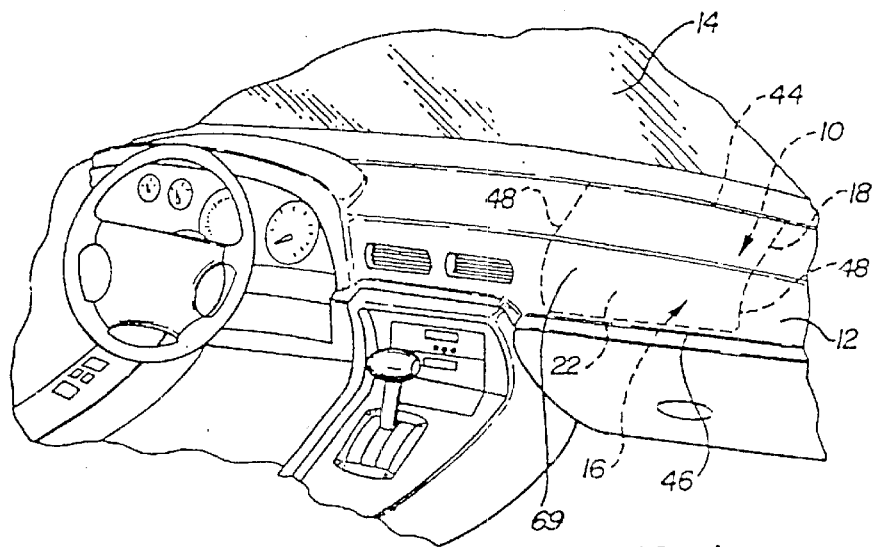
FIG. 1 is a perspective view of a first passive restraint system constructed according to the present invention and installed in a vehicle dash panel.
Figure 2:
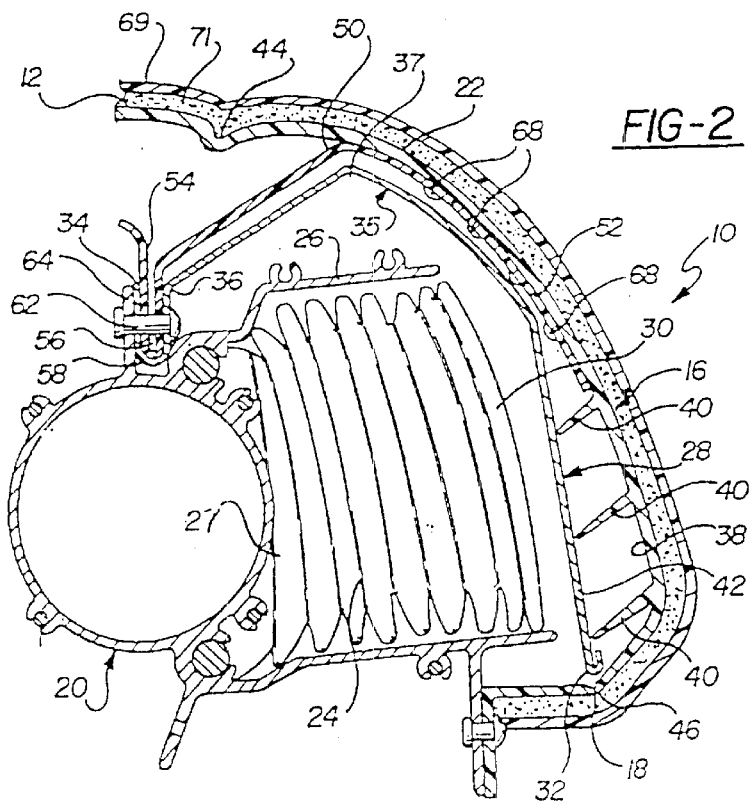
FIG. 2 is a cross-sectional end view of the passive restraint system of FIG. 1.
Figure 3:
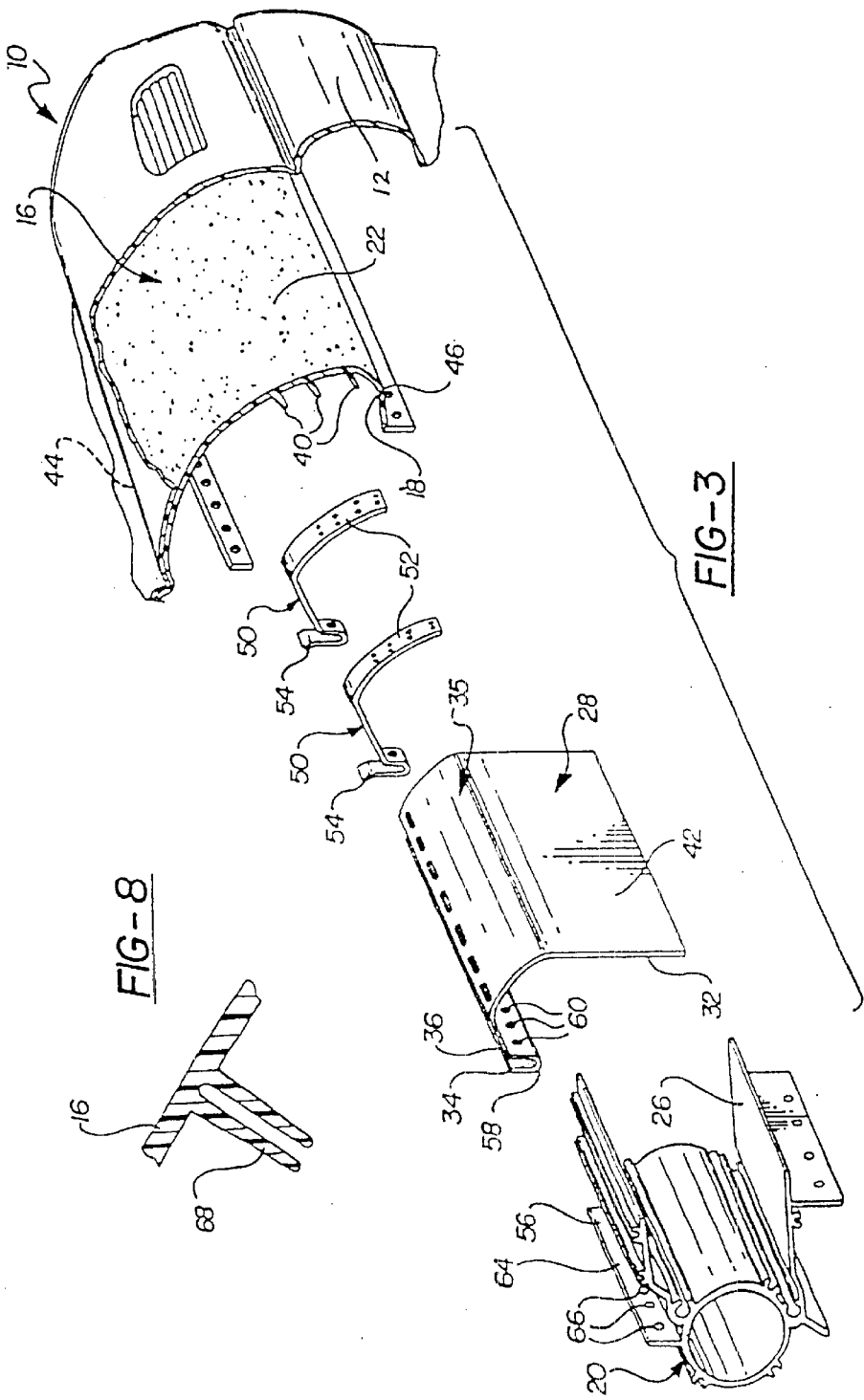
FIG. 3 is an exploded view of the passive restraint system of FIG. 1.

A first embodiment of an inflatable restraint assembly for an automotive vehicle is generally indicated at 10 in FIGS. 1–3. A second embodiment is generally indicated at 10' in FIGS. 4–7. A third embodiment is generally indicated at 10" in FIGS. 9–11. Reference numerals with the designation prime (') in FIGS. 4–7 and double prime (") in FIGS. 9–11 indicate alternative configurations of elements that also appear in the first embodiment. Where a portion of the following description uses a reference numeral to refer to the figures, we intend that portion of the description to apply equally to elements designated by primed numerals in FIGS. 4–7 and double-primed numerals in FIGS. 9–11.

An alternative construction of the third embodiment is generally indicated at 10b in FIG. 17. Reference numerals with the suffix "b" in FIG. 17 indicate elements of FIG. 17 that correspond to similar or identical elements shown in FIGS. 9–11. Where a portion of the description of the third embodiment uses a reference numeral to refer to the figures, we intend that portion of the description to apply equally to elements designated by the suffix "b" in FIG. 17.

In FIG. 1, the inflatable restraint assembly is shown hidden behind an automotive vehicle passenger-side dash panel 12 below a windshield 14 of the vehicle. As shown in FIG. 2, the apparatus includes the panel 12, and an air bag deployment door 16 integrally formed in the panel 12 and having a perimeter defined, in part, by a hidden marginal edge 18. The perimeter may also be defined as the lateral boundary of the door 16—the door 16 being defined as that portion of the integrally formed panel 12 and door 16 that is separable or bendable from the panel 12 under the force of air bag inflation. The door 16 and the vehicle dash panel 12 are integrally formed as a single unitary piece.

As shown in FIGS. 2 and 3, an air bag dispenser assembly 20 is supported behind the door 16, i.e., on a side of the door 16 opposite a door outer surface 22. The dispenser 20 is also disposed adjacent and aligned with the air bag deployment door 16. As is best shown in FIG. 2, the air bag dispenser 20 is configured to direct air bag deployment along a deployment path through the door 16 of the vehicle panel 12, the air bag deployment path being the path that the air bag will travel along as it inflates during deployment. The air bag deployment path is best exemplified by the respective areas occupied by the inflated air bags shown at 24' in FIG. 7, 24" in FIG. 11, and at 24s in FIGS. 13 and 15. The dispenser 20 may be any suitable type of air bag dispenser to include, for example, the dispenser described in U.S. Pat. No. 5,564,731 and incorporated herein by reference.

An air bag 24 is supported in an air bag receptacle 26 of the air bag dispenser 20 and is operatively connected to the air bag dispenser 20 at an open end 27 of the air bag 24. A closed outer end 30 of the air bag 24 is disposed adjacent the air bag 24 deployment door 16.

As is best shown in FIG. 2, a rigid metal reaction plate 28 is disposed between the air bag 24 and the air bag deployment door 16. The reaction plate 28 receives the force of air bag deployment when the air bag 24 inflates and expands out of the dispenser 20. The reaction plate 28 directs and distributes that force across the door 16 to predictably separate the door 16 from the panel 12 along the hidden marginal edge 18 of the door 16. By distributing the air bag 24 opening force across the door 16 the reaction plate 28 also serves to prevent air bag 24 opening forces from concentrating in other locations on the door 16 that night result in door 16 or panel 12 fractures and/or fragmentation. In the present embodiment, the reaction plate 28 is positioned to concentrate air bag opening forces along a portion of the hidden marginal edge 18 that extends along the forward marginal edge 46 of the door 16. The reaction plate 28 is positioned in this way to initiate marginal edge tearing at the forward marginal edge 46 and then allow the tearing to propagate upward along the two side edges of the door 16. Alternatively, marginal edge tearing may be initiated at the forward marginal edge 46 and along the two side edges virtually simultaneously. The reaction plate 28 is preferably made of cold rolled steel but may be made from any other material having suitable bending and force-distributing characteristics.

As is best shown in FIG. 3, the reaction plate 28 includes a reaction plate outer marginal edge 32 having a shape generally identical to that of the hidden marginal edge 18 of the air bag deployment door 16. The reaction plate marginal edge 32 is aligned with the hidden marginal edge 18 of the air bag deployment door 16 to concentrate air bag 24 inflation stress along the hidden marginal edge 18 of the air bag deployment door 16.

As shown in FIG. 2, the reaction plate 28 is pivotally attached along a reaction plate inner edge 34 to the air bag dispenser apparatus 20. However, in other embodiments, the reaction plate 28 may be pivotally attached to a portion of the panel 12 or other surrounding support structures. An outer pivotable portion of the reaction plate 28, generally indicated at 35 in FIGS. 2 and 3, is outwardly and upwardly pivotable away from the air bag dispenser 20. The outer reaction plate portion 35 pivots by bending along a first horizontal hinge line 36 of the reaction plate 28 that extends parallel to and adjacent the rigidly attached inner plate edge 34. The hinge line 36 defines a marginal inner edge of the outer portion 35 of the reaction plate. A pivotable lower panel portion 42 of the reaction plate also pivots by bending along a second horizontal hinge line 37 of the reaction plate 28 that extends parallel to the first hinge line 36. The force of an inflating air bag causes the outer portion 35 of the reaction plate 28, which includes the pivotable lower panel portion 42 of the reaction plate 28, to pivot outward. The pivotable lower panel portion 42 of the reaction plate 28 then continues pivoting, due to angular momentum acquired from air bag deployment, into a position angularly spaced from the air bag deployment path and more than 45 degrees from its position before air bag deployment. Examples of such an angularly spaced position of the lower panel portions of reaction plates are shown by reference to lower panel portions 42' and 42" in FIGS. 7 and 11, respectively.

As shown in FIG. 2, the outer portion 35 of the reaction plate 28 is disposed adjacent a door inner surface 38 and opposite the outer door surface 22. As is best shown in FIG. 2, the outer portion 35 and, therefore, the pivotable lower panel portion 42 of the reaction plate 28 are separate from the door 16. This allows the outer portion 35 and pivotable lower panel portion 42 of the reaction plate 28 to move independently of the door 16 following door separation. This prevents the outer portion 35 of the reaction plate 28 from arresting or restricting the opening motion of the door 16.

Three horizontal ribs, shown at 40 in FIGS. 2 and 3, extend integrally inward from the door inner surface 38 to a point adjacent the pivotable lower panel portion 42 of the outer portion 35 of the reaction plate as shown in FIGS. 2 and 3. The ribs 40 space the reaction plate lower panel 42 from the door inner surface 38. The ribs 40 allow the reaction plate 28 to be positioned in a plane that is generally perpendicular to the direction of air bag 24 deployment while remaining in close proximity to the door 16. The ribs 40 also allow the door 16 to be designed with outer contours that do not necessarily correspond to the reaction plate 28 configuration. In other embodiments, the ribs 40 may be of any suitable configuration and orientation known in the art.

As shown in FIGS. 1–3, the air bag deployment door 16 has a curved rectangular shape defined by relatively straight aft 44 and forward 46 marginal edges and a pair of arcade side marginal edges 48. The forward 46 and side 48 edges comprise a frangible region of reduced cross section. The rear edge 44 may comprise a styling seam or groove intended to define the rear edge 44 of the door 16. In other embodiments, the rear edge 44 may be hidden or there may be no "rear edge". In other words, the transition from the door to the panel 12 may be uninterrupted.

Where a styling seam is used, it may be functional or merely aesthetic. Where the styling seam is functional, it may be adapted to act as a bending hinge 44 when the door 16 is forced open and separated from the surrounding vehicle panel 12 along the frangible forward 46 and side 48 marginal edges. The bending hinge 44 allows the door 16 to swing outward and upward from the panel 12 during air bag 24 deployment while retaining the door 16 to the panel 12. Alternatively, the styling seam may also be designed as a frangible region of reduced cross section in similar fashion to the forward 46 and side 48 edges.

A first pair of flexible tethers is generally indicated at 50 in FIGS. 2 and 3. Each tether comprises PVC-coated nylon, has an outer end portion 52 fastened to the door inner surface 38, and an inner end portion 54 fastened to the air bag dispenser assembly 20. In other embodiments, the first pair of flexible tethers 50 may be fastened to the panel 12 or other adjacent support structures instead of the dispenser 20. The tethers 50 may incorporate any one or more of a number of different tether constructions known in the art. One example of an acceptable tether construction is disclosed in U.S. Pat. No. 5,564,731, is assigned to the assignee of the present invention and is incorporated herein by reference.

The inner end portion 54 of each tether 50 of the first pair of tethers is fastened to the air bag dispenser assembly 20 at a tether control point shown at 56 in FIG. 2 adjacent the reaction plate inner edge 34. The tether inner end portions 54 are fastened by folding them within a U-shaped channel 58 formed along the reaction plate inner edge 34. As shown in FIG. 3, a row of holes 60 is formed along each side of the U-shaped reaction plate channel 58 to receive fasteners 62 that attach the reaction plate 28 to an elongated rectangular air bag dispenser flange 64. The dispenser flange 64 is horizontally disposed and extends integrally upward from the air bag dispenser apparatus 20. The flange 64 includes a row of flange holes 66 corresponding to the holes in the U-shaped reaction plate channel 58. One or more of the fasteners that connect the reaction plate 28 to the dispenser assembly 20 also pass through the portion of each tether inner end 54 that is folded within the U-shaped channel 58.

As is best shown in FIG. 2, the outer end portion 52 of each tether 50 of the first pair of tethers is fastened to the door 16 by eight heat-staked pins 68. The pins 68 extend integrally inward from the air bag 24 deployment door 16 as shown in FIG. 8. The pins 68 are preferably formed with the door 16 and the vehicle panel 12 as a single unitary piece. Other embodiments may use hot staked bosses as disclosed in U.S. Pat. No. 5,564,731, assigned to the assignee of the present invention and incorporated herein by reference. Still other embodiments may use screws 76b engaged With screw bosses as is representatively shown at 67 in FIG. 17. The screw bosses 67 may be integrally formed to extend inward from the door 16. The bosses 67 may be threaded or unthreaded for use with self-tapping screws. Other embodiments may use any number of suitable fastening means known in the art.

The bag inflatable restraint assembly 10 described above is optimized to open integral doors in vehicle trim panels, comprising hard outer or "first" surfaces, e.g., injection-molded panels. However, the invention may also be used where, as shown in FIG. 2, the hard outer surface is covered with a flexible skin 69 or skin 69 and foam 71 layers. In other words, a flexible skin 69 may be applied to cover at least a portion of the vehicle dash panel 12 and/or air bag deployment door 16 in a layered disposition. A foam layer 71 may also be included between the skin 69 and a portion of the panel 12 and/or the door 16.

The door 16 and panel 12 preferably comprise an injection molded polycarbonate/acrylionitrile butadiene styrene blend (PC/ABS) or polypropylene. Examples of acceptable PC ABS formulations include GE MC 8002 and Dow Pulse #830. An example of an acceptable polypropylene is Montell #BR33GC. Other suitable materials may include polyesters, polyurethanes, polyphenylene oxide, polystyrenes, polyolefins, or polyolefin elastomers.

According to the second embodiment of the invention shown in FIGS. 4–7, the air bag deployment door 16' is defined by a visible marginal edge 18' and includes eight doghouse-shaped fastener brackets 70. Each fastener bracket 70 extends integrally inward toward the air bag dispenser assembly 20' from the door inner surface 38' in place of the ribs 40 of the first embodiment. Each fastener bracket 70 includes an attachment surface 72 spaced inwardly from and supported generally parallel to the door inner surface 38'. The fastener brackets 70 are preferably integrally formed with the door 16' and the vehicle dash panel 12' as a single unitary piece.

The first tether 50' of the second embodiment makes up a portion of a single continuous tether sheet rather than comprising two separate tethers as in the first embodiment. As shown in FIGS. 4–7, an outer end 52' of the first tether 50' is attached to a forward portion 74 of the door 16' adjacent a forward marginal edge 46' of the door 16' disposed opposite the hinge 44'. More specifically, four rivets 76 attach the outer end 52' of the first tether 50' to the attachment surfaces 72 of four fastener brackets 70 formed on the forward portion 74 of the door 16. The fastener brackets 70 support the rivets 76 without affecting the aesthetic continuity of the outer door surface 22'. In other embodiments, other fastener bracket configurations including heat staking pins and screw bosses and other suitable types of fasteners and fastening methods may be used as is known in the art.

Figure 4:
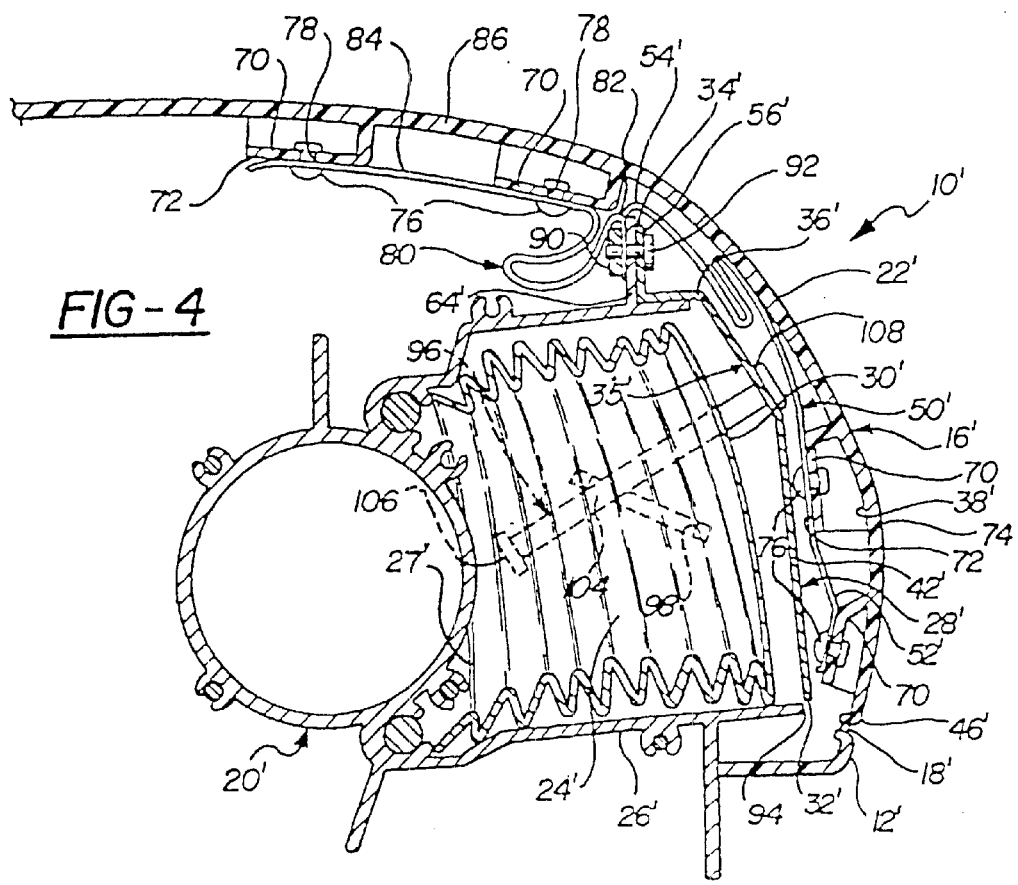
FIG. 4 is a cross-sectional end view of a second passive restraint system constructed according to the present invention.
Figure 5:
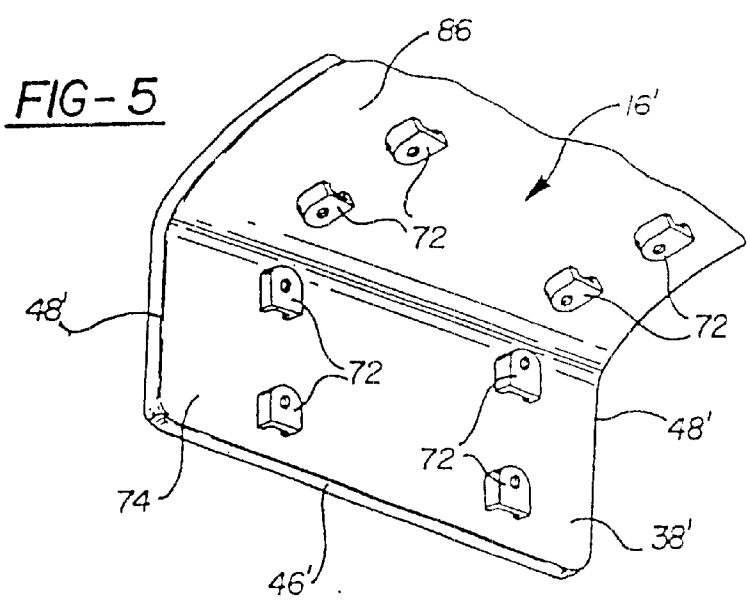
FIG. 5 is a fragmentary perspective view of an air bag door of the passive restraint system of FIG. 4.

As shown in FIGS. 4 and 7, each fastener bracket 70 includes a fastener aperture 78 disposed through the attachment surface 72 of the bracket 70 to receive one of the rivets 76. Each rivet 76 comprises a shaft portion that extends through the aperture 78 and through a hole formed in the first tether 50' to hold the first tether 50' to the fastener bracket 70 in conventional fashion.

The four fastener brackets 70 that attach the first tether 50' to the door 16' extend integrally inward from the door inner surface 38' adjacent a lower marginal region of the door 16' to a point adjacent the reaction plate 28'. Similar to the ribs 40 of the first embodiment, the fastener brackets 70 present the reaction plate lower panel 42' in a plane more perpendicular to the direction of air bag 24' deployment from the dispenser 20'. In other words, die fastener brackets 70 span the space between the outwardly curved lower marginal door region and the generally vertical reaction plate lower panel 42'.

The single continuous tether sheet that includes the first flexible tether 50' also includes a second flexible tether, generally indicated at 80 in FIGS. 4 and 7. The second tether 80 has an inner end portion 82 fastened to the air bag dispenser assembly 20' at the tether control point 56'. In other embodiments, the second tether 80 may be secured either to the panel 12' or to another adjacent structure. The second flexible tether 80 has an outer end portion, shown at 84 in FIGS. 4 and 7, that is fastened to an aft portion 86 of the door 16' disposed between the forward door portion 74 and the hinge 44'. The second tether 80 ties the aft door portion 86 to the control point 56' to prevent any portion of the door from over-pivoting towards the windshield 14 and breaking off at one of several potential bending points including the hinge 44'.

As shown in FIGS. 4 and 7, the respective inner ends 54', 82 of the first 50' and second 80 tethers are riveted to an elongated rectangular flange 64' at the tether control point 56'. The flange 64' extends integrally upward from the air bag receptacle portion 26' of the air bag dispenser assembly 20'. The tether inner ends 54', 82 are sandwiched between the flange 64' and an elongated metal bar 90. Rivets 92 pass through the flange 64', the tethers 50', 80 and the bar 90.

The air bag receptacle 26' includes a mouth 94 disposed adjacent the air bag deployment door 16'. The mouth 94 has a width measured across the mouth in a direction perpendicular to the hinge 44', i.e., in a generally vertical direction. The hinge 44' is spaced from the mouth 94 a distance equal to at least half of the mouth width. The hinge 44' is displaced in this manner to reduce the maximum opening angle at the hinge 44' to reduce material deformation and stress in the hinge during air bag 24 deployment.

A pair of rigid stop members, representatively indicated at 96 in FIG. 7, are operatively connected to the reaction plate 28' and the air bag dispenser 20'. The stop members 96 limit reaction plate 28' opening travel. The stop members 96 may arrest the reaction plate 28' in a position that will prevent the door 16' from returning to its original position after air bag 24' deployment. Each stop member is preferably fabricated from steel but may be made of other suitably rigid materials.

The stop members 96 are slidably supported in slots representatively shown at 98 in FIG. 7 and disposed at opposite lateral sides of the receptacle portion 26' of the air bag dispenser apparatus 20'. Each stop member 96 is fixed to the reaction plate 28' at a stop point representatively shown at 100 in FIG. 7. The stop point 100 is disposed between the first hinge line 36' and a reaction plate outer marginal edge 32' disposed opposite the reaction plate inner edge 34'.

The outer panel portion 42' of the reaction plate 28' is outwardly and upwardly pivotable away from the air bag dispenser 20' by bending the reaction plate 28' along a second horizontal hinge line shown at 102 in FIG. 7. The second hinge line 102 is disposed horizontally across the reaction plate 28' adjacent the stop point 100 and extends generally parallel to the first hinge line 36'. The second hinge line 102 is spaced approximately one-third the distance between the first hinge line 36' and the reaction plate outer marginal edge 32'. This double hinge arrangement allows the reaction plate 28' to bend into an outwardly pivoted and upwardly extended position. In this position the plate 28' prevents the air bag deployment door 16' from rebounding off the tethers 50', 80 and returning to its original position immediately after a deploying air bag 24' has forced the door 16' open.

Each stop member 96 is an elongated steel pin having a cylindrical shaft portion 104 as is representatively shown in FIG. 7. Inner 106 and outer 108 circular disk-shaped stop flanges are disposed at respective inner and outer distal ends of the shaft portion 104 of each stop member 96. The inner stop flange 106 of each stop member 96 extends radially and integrally outward from the shaft portion 104. The outer stop flange 108 of each stop member 96 is preferably fixed to the reaction plate 28' by spot welding or arc welding.

The elongated slots 98 on either side of the air bag receptacle 26' each have a width slightly greater than that of the shaft portion 104 of each stop member 96. The shaft portion 104 of each stop member 96 is slidably disposed within one of the slots 98 to allow the stop members 96 to move between preinflation stowed positions, representatively shown in FIG. 4, and post-inflation deployed positions, representatively shown in FIG. 7. The reaction plate 28' pulls the stop members 96 from the stowed position to the deployed position when the reaction plate 28' opens under the force of an inflating air bag 24'. When the stop members 96 reach their deployed positions the inner stop flanges 106 engage the slot 98 and arrest reaction plate 28' movement. The stop members 96 arrest the reaction plate 28' in a position to prevent the door 16' from returning to its original position following air bag deployment.

Figure 9:
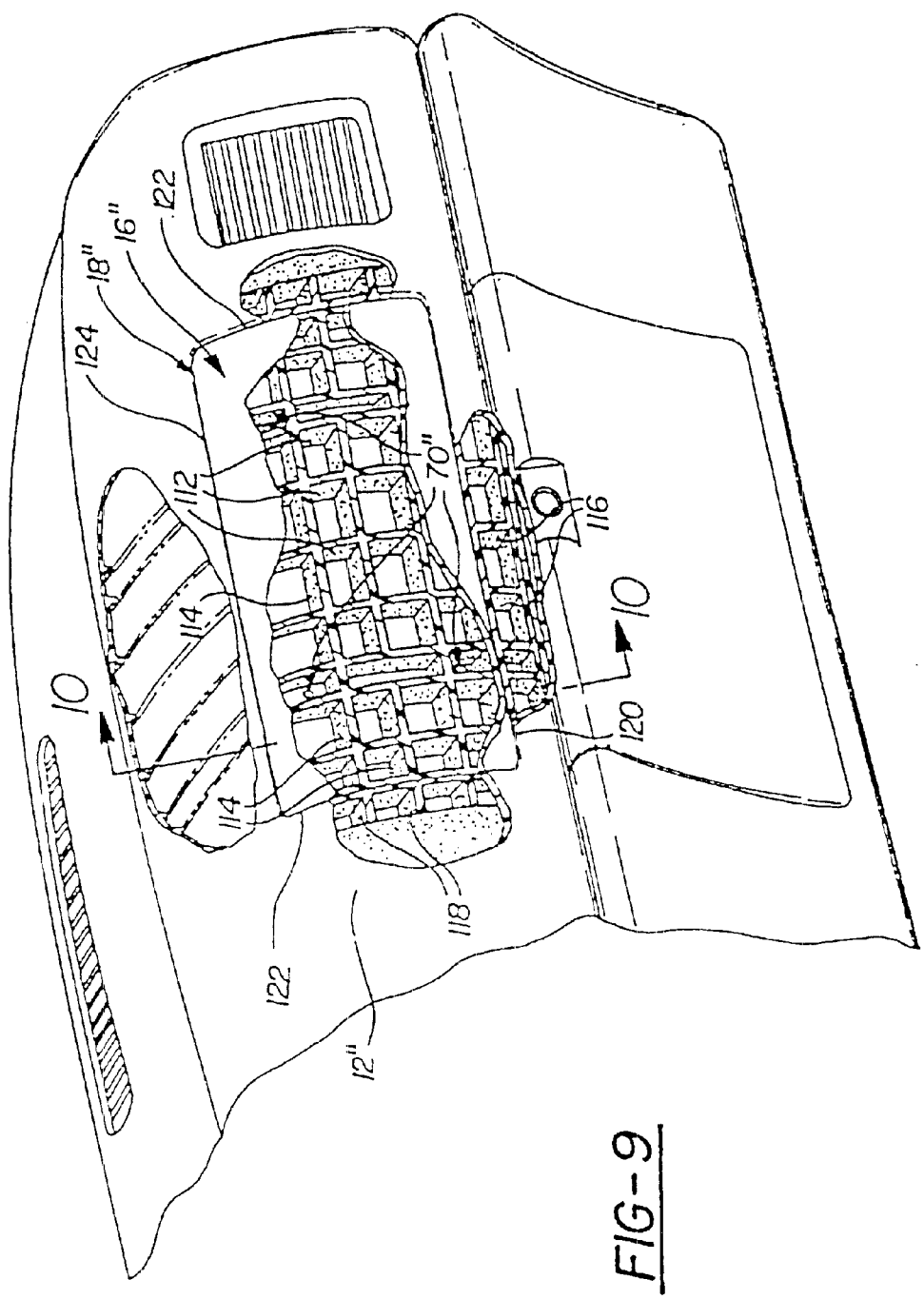
FIG. 9 is a perspective view of a third passive restraint system constructed according to the present invention and installed in a vehicle dash panel.
Figure 10:
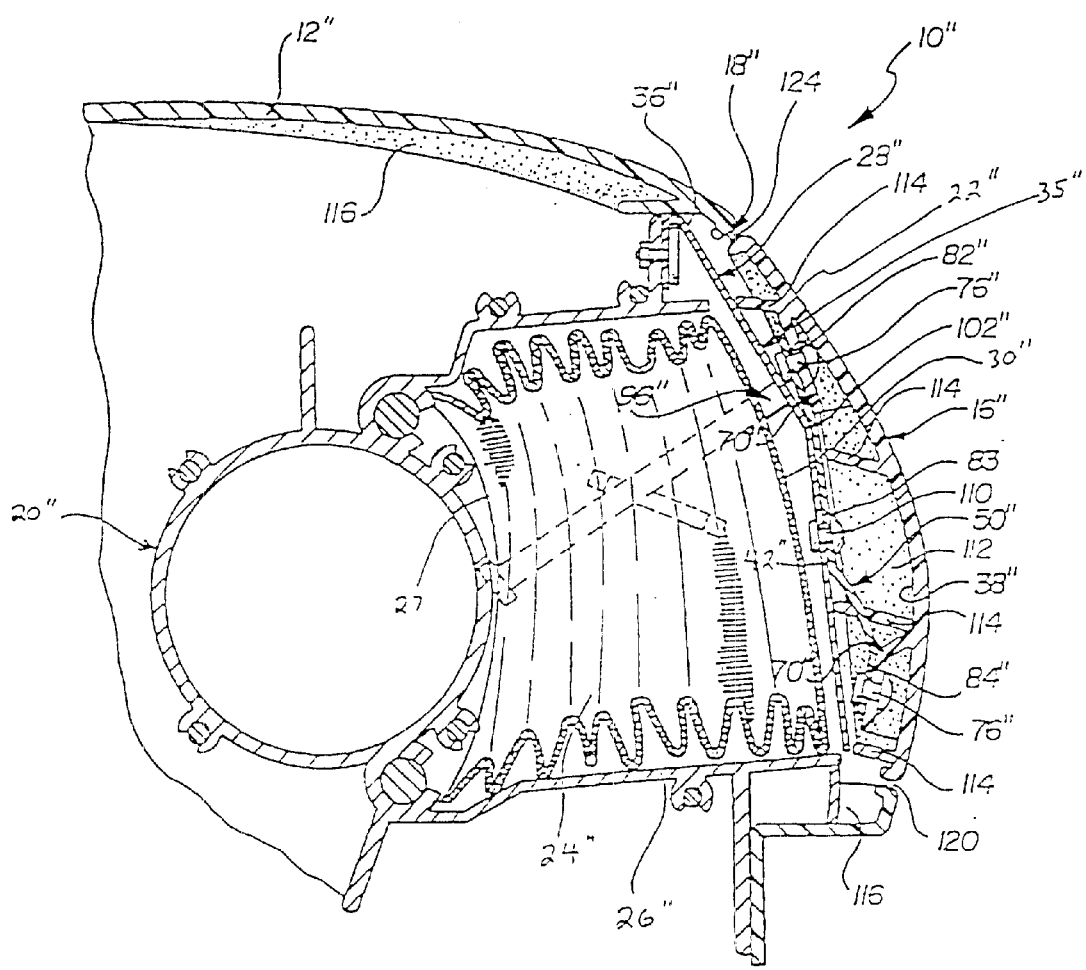
FIG. 10 is a cross-sectional view of the passive restraint system of FIG. 9 taken along line 10—10 of FIG. 9.
Figure 11:
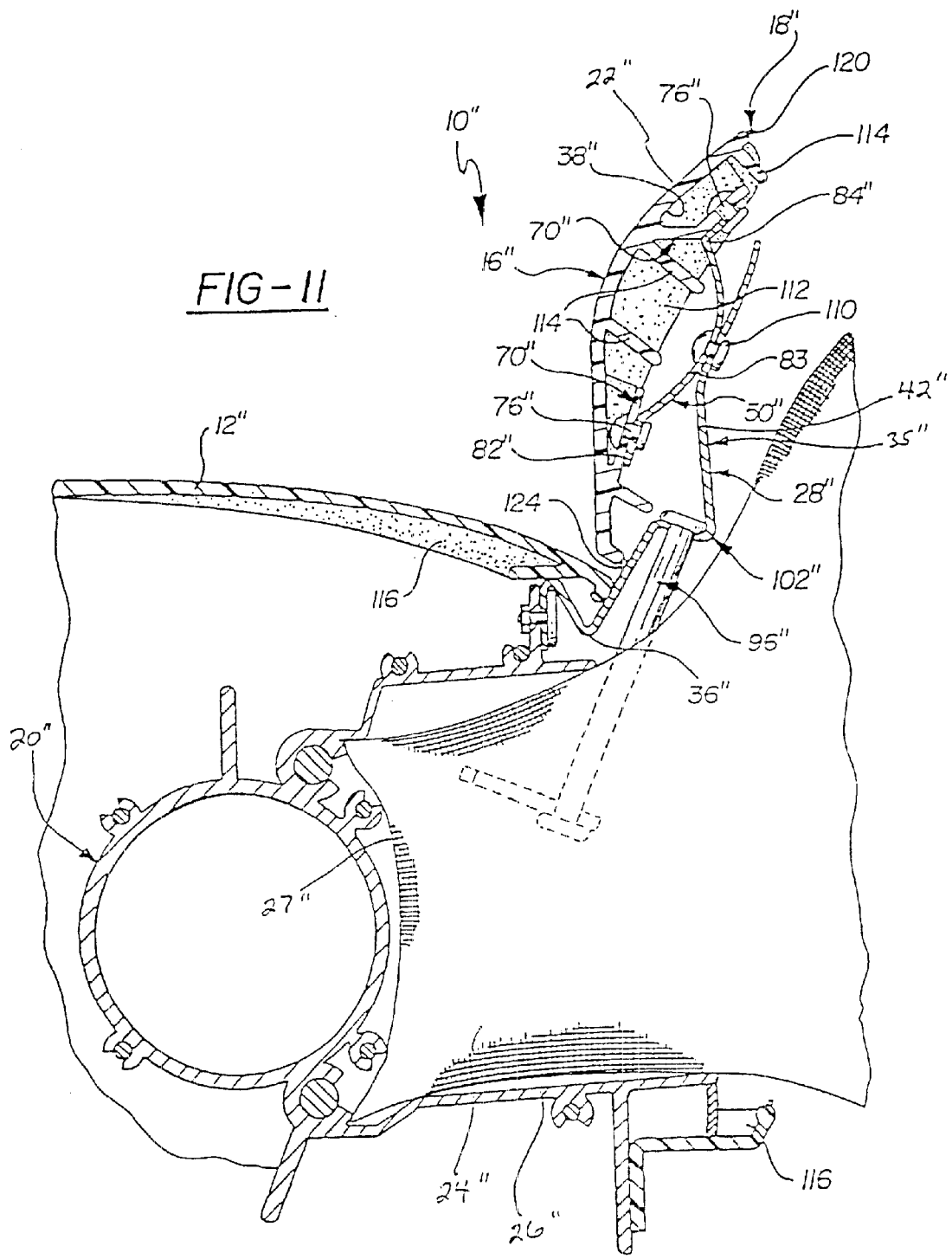
FIG. 11 is a cross-sectional view of the passive restraint system of FIG. 9 taken along line 10—10 of FIG. 9 during air bag inflation.

According to the third embodiment of the invention shown in FIGS. 9–11, the frangible marginal edge 18" defines the entire perimeter of the air bag deployment door 16". In other words, the frangible marginal edge 18" extends completely around the air bag deployment door 16" in an unbroken circuit as is best shown in FIG. 9. A pair of flexible tethers, representatively indicated at 50" in FIGS. 10 and 11, is fastened between the air bag deployment door 16" and the reaction plate 28". Each tether 50" includes an inner end portion 82" fastened to the door 16", an outer end portion 84" fastened to the door 16" and a middle portion 83 fastened to the reaction plate 28" between the second hinge line 102" and the reaction plate outer marginal edge 32". The middle portion 83 of each tether 50" is disposed approximately midway between the inner 82" and outer 84" end portions of each tether 50?.

The air bag deployment door 16" includes only four of die fastener brackets 70" disposed in a rectangular pattern as shown in FIG. 9. The inner end portion 82" and outer end portion 84" of each tether 50" are fastened to the attachment surface of one of the four fastener brackets 70" by rivets 76" as shown in FIGS. 10 and 11. As is also shown in FIGS. 10 and 11, the middle portion 83 of each tether 50" is fastened to the reaction plate 28" between the second hinge line 102" and the reaction plate outer marginal edge 32" by a rivet 110.

As shown in FIGS. 9–11, nine vertical door ribs 112 extend integrally inward from the door inner surface 38" to a point adjacent the reaction plate 28". 24 short horizontal door ribs 114 connect adjacent vertical door ribs 112 to form a rectangular grid pattern best shown in FIG. 9. As best shown in FIG. 9, a plurality of vertical 116 and horizontal 118 panel ribs also extend integrally inward from an inner surface of the vehicle panel 12" adjacent the frangible marginal edge 18" of the door perimeter and are spaced apart around the door perimeter. The door ribs 112, 114 and panel ribs 116, 118 stiffen the door 16" and vehicle panel 12" against air bag opening shock and help concentrate opening forces along the frangible marginal edge 18" between the panel 12" and the door 16". The door ribs 112, 114 and panel ribs 116, 118 are integrally formed With the door 16" and the vehicle panel 12" as a single unitary piece by injection molding.

In practice, when the air bag inflates it forces the reaction plate 28" to bend outward and upward around the first 36" and second 102" horizontal hinge lines. As the reaction plate 28" pivots outward it concentrates the inflation force along a lower edge portion 120 of the frangible door edge 18". This helps to predictably separate the door 16" from the vehicle dash panel 12" by tearing first along a lower edge portion 120 of the marginal edge 18" of the door 16" then allowing the tear to propagate up twos side edge portions 122 of the door edge 18". The tear then propagates from the side edge portions 122 inwardly along an upper edge portion 124 of the marginal door edge 18" until the door 16" completely separates from the vehicle dash panel 12". Because the two tethers 50" connect the door 16" directly to the reaction plate 28", they prevent the door 16" from flying free. Similar to the second embodiment, the stop members 96" of the third embodiment limit how far the reaction plate 28" can bend, leaving the reaction plate 28" in a generally vertical position. Unlike the second embodiment, however, the upwardly-bent reaction plate 28" and the tethers 50" of the third embodiment hold the air bag deployment door 16" away from vehicle occupants. Alternatively, tearing may occur along the lower edge portion 120, side edge portions 122 and upper edge portion 124 virtually simultaneously.

In other embodiments, in place of the pin and slot arrangement described for the stop member above, any one of a number of different configurations may be employed to arrest reaction plate 28 travel in a position to prevent an air bag door 16 from returning to its original position.

A fourth embodiment of an inflatable restraint assembly is generally shown at 10s in FIGS. 12–16. Reference numerals with the suffix "s" in FIGS. 12–16 indicate alternative configurations of elements that also appear in the third embodiment. Where portions of the third embodiment description use reference numerals to refer to the figures, we intend those portions to apply equally to elements designated by the suffix "s" in FIGS. 12–16.

Figure 12:
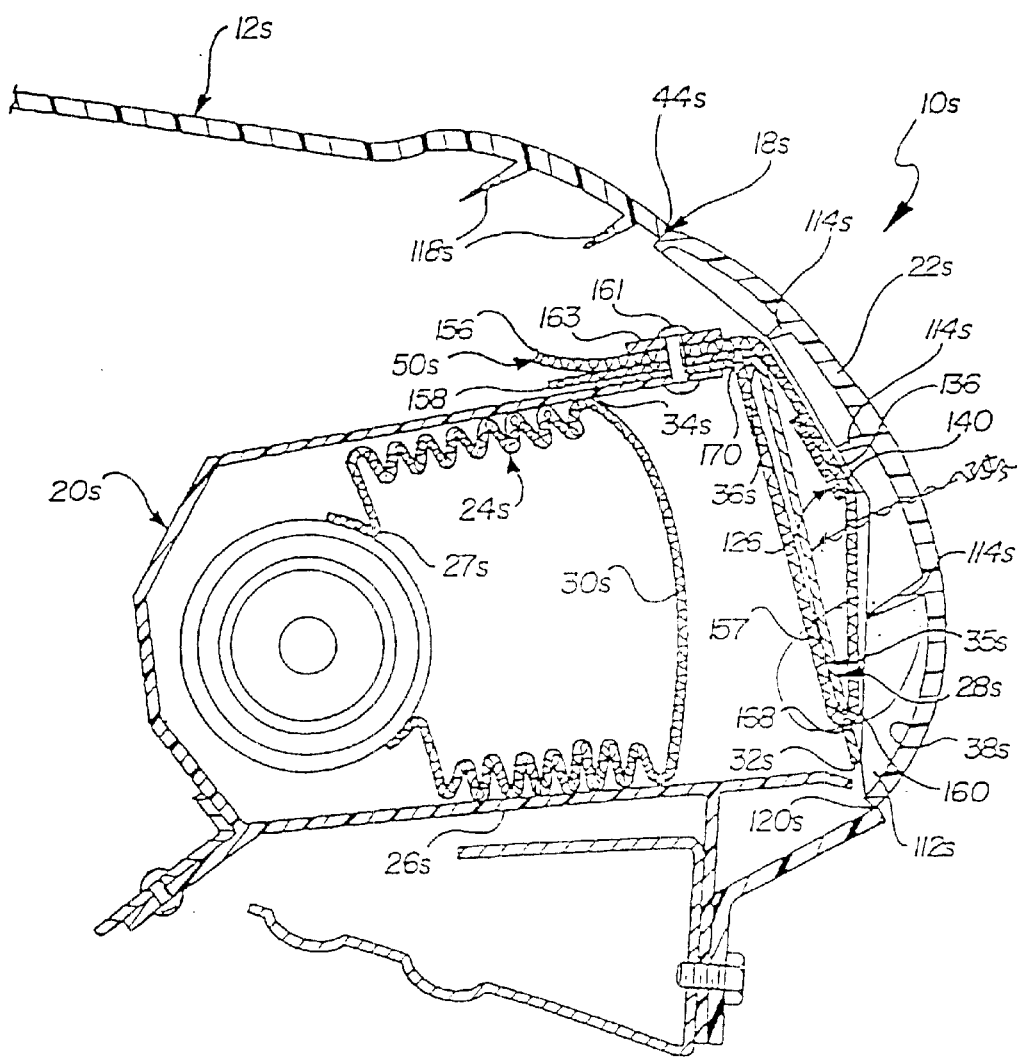
FIG. 12 is a first cross-sectional view of a fourth passive restraint system constructed according to the present invention.
Figure 13:
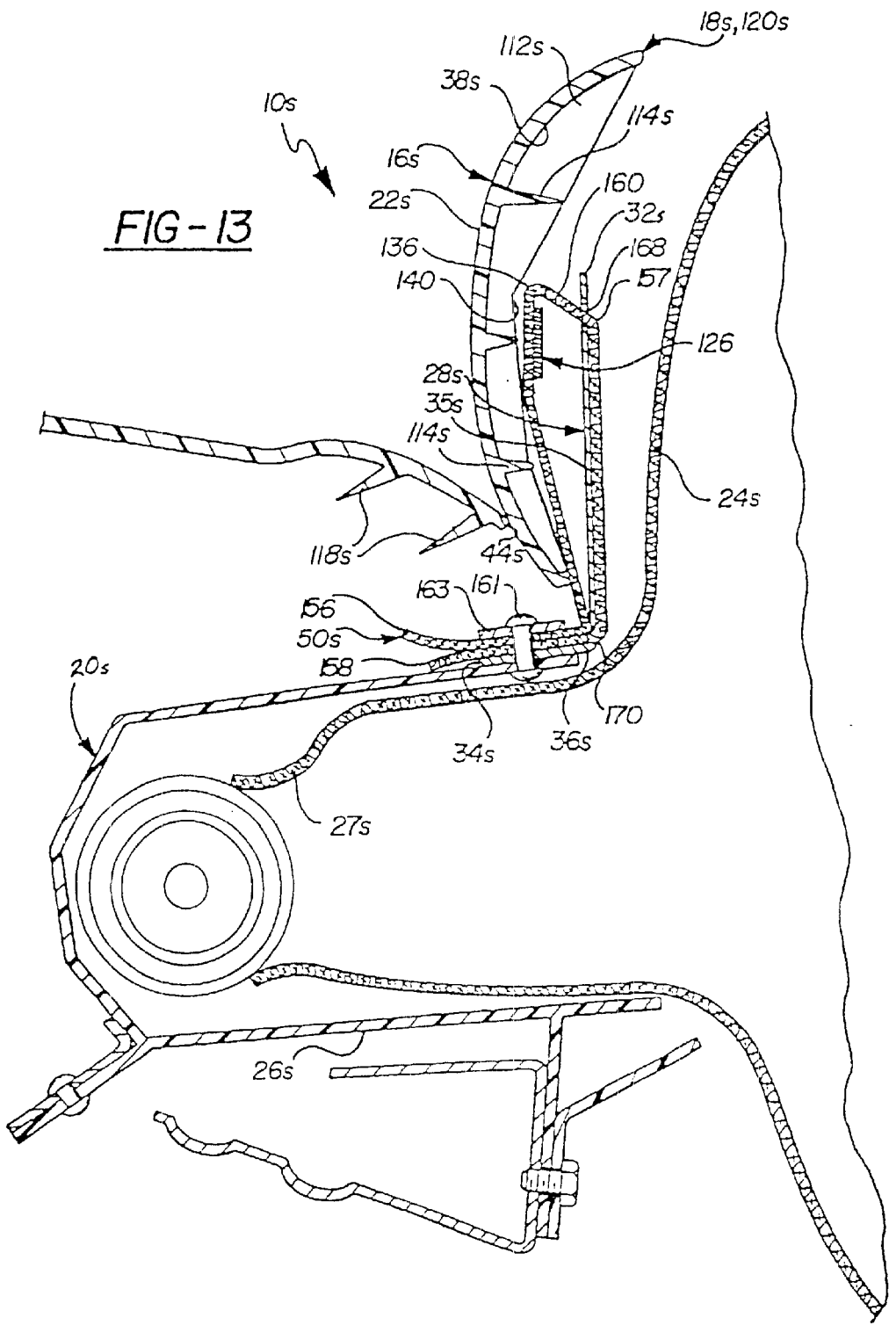
FIG. 13 is a cross-sectional view of the passive restraint system of FIG. 12 during air bag inflation.

The inflatable restraint assembly generally indicated at 10s includes first and second vertically-disposed elongated flexible nylon tethers, generally indicated at 50s, 51s in FIG. 16, and representatively indicated at 50s in FIGS. 12 and 13. The tethers 50s, 51s slidably engage the door 16s rather than being fixed to the door 16s as disclosed in the description of the third embodiment. The apparatus 10s includes a flat, elongated flexible nylon fabric strap, generally indicated at 126 in FIGS. 12–16. The strap 126 has a length extending between two strap ends and is horizontally disposed flat against the door 16s. As is best shown in FIG. 16, the strap 126 is fastened to the door 16s at first, second, third and fourth spaced attachment points 128, 130, 132, 134.

Each flexible tether 50s, 51s includes a tether loop, representatively shown at 157 in FIGS. 12 and 13 and at 157 and 159, respectively, in FIG. 16. The loop portion 157 of each tether 50s, 51s extends from at least one common tether loop attachment portion. In the present embodiment, the tether loop attachment portions each comprise first and second tether loop ends, representatively shown at 156, 158 in FIGS. 12 and 13. Fasteners 161 extend through a strap retention member 163, both tether loop ends 156, 158, the reaction plate 28s and the air bag dispenser 20s. The fasteners 161 fasten the tether loop ends 156, 158 together, and fasten the loop ends 156 and reaction plate 28s to the air bag dispenser 20s adjacent the reaction plate inner edge 34s. In other embodiments the first tether loop end 156 of each tether 50s, 51s may be attached at a different location than the second tether loop end 158 of each tether 50s, 51s.

A middle portion 136 of the first flexible tether 50s slidably extends between the door 16s and the strap 126, perpendicular to the length of the strap 126, and passes between the first and second attachment points 128, 130. Likewise, a middle portion 138 of the second flexible tether 51s slidably extends between the door 16s and the strap 126, perpendicular to the length of the strap 126, and passes between the third and fourth attachment points 132, 134. In other words, the strap 126 holds the flexible tethers 50s, 51s against the door 16s while allowing the flexible tethers 50s, 51s to slide longitudinally through a pair of slots 140, 142. The slots 140, 142 are formed between the strap 126,.the door 16s and the attachment points 128–134 as best shown in FIGS. 12, 13 and 16.

Figure 14:
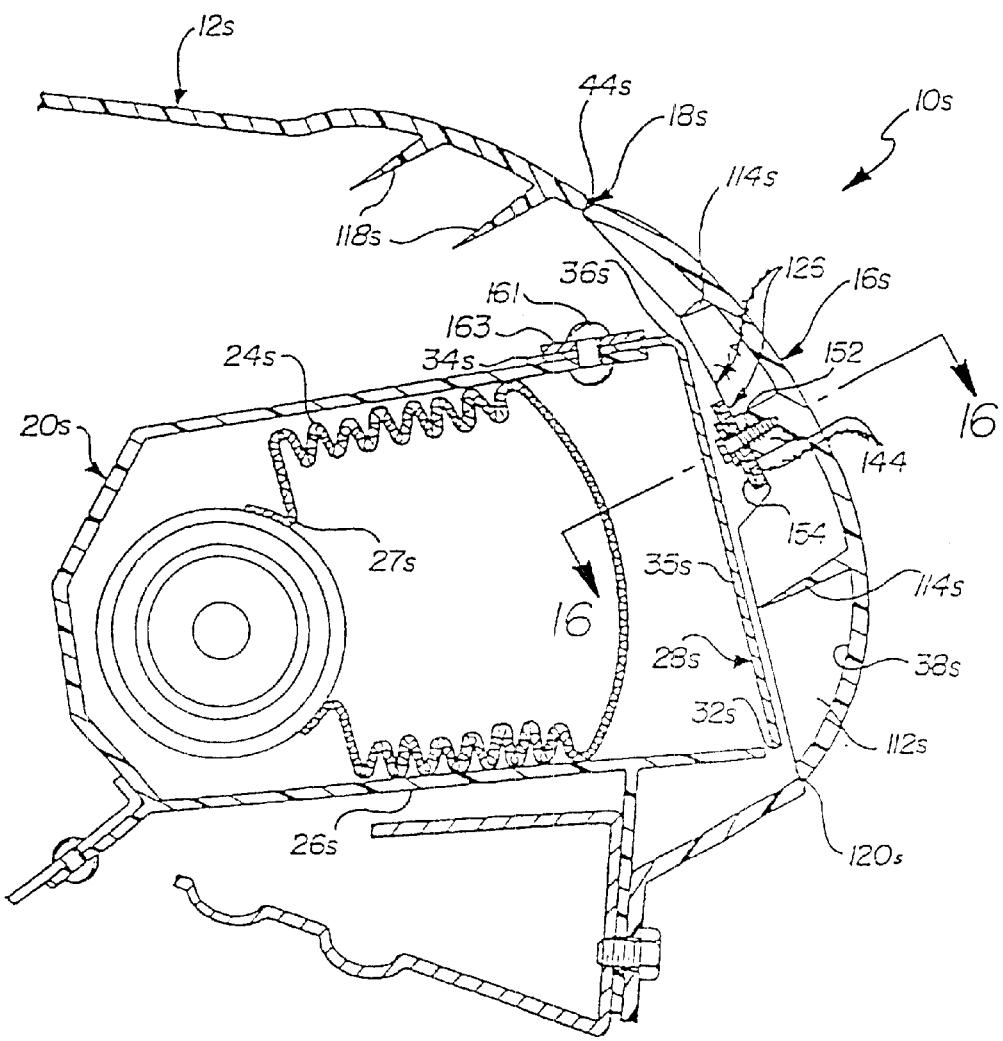
FIG. 14 is a cross-sectional view of the passive restraint system of FIG. 12 taken through a screw boss of the system.
Figure 15:
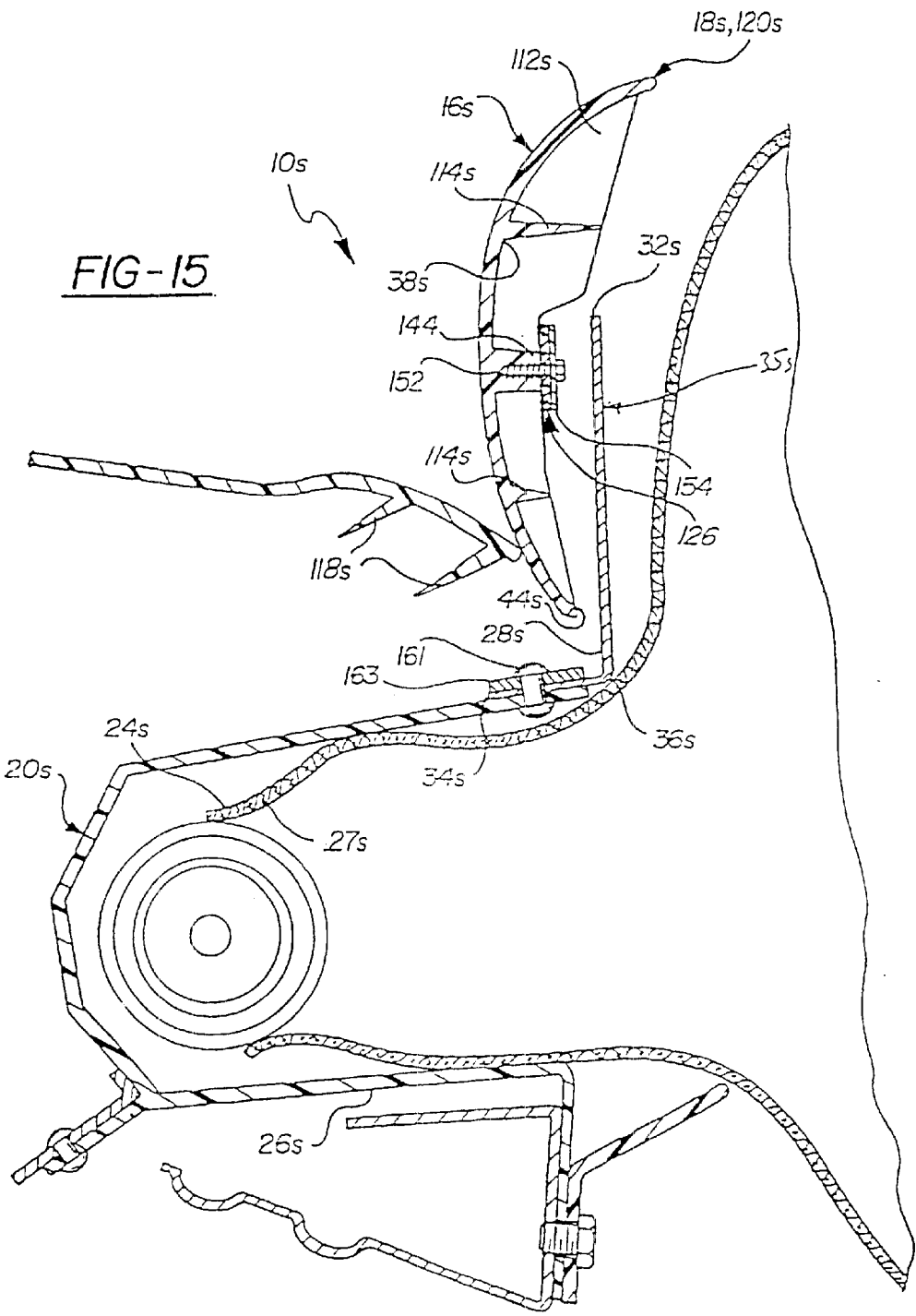
FIG. 15 is a cross-sectional view of the passive restraint system of FIG. 12 taken through a screw boss of the system during air bag inflation.

The apparatus (10s) includes first, second, third and fourth screw bosses, shown at 144, 146, 148 and 150 in FIG. 16 and representatively shown at 144 in FIGS. 14 and 15. The bosses 144–150 extend integrally inward from a door inner surface 38s to the respective first, second, third and fourth attachment points 128–134. The screw bosses 144–150 are integrally formed with the door 16s as a unitary piece and are aligned horizontally along the door inner surface 38s. As shown in FIGS. 14–16, screw-type fasteners 152 extend through respective annular washers 154 and attach the strap 126 to the respective first, second, third and fourth bosses 144–150 by threadedly engaging the bosses 144–150.

As with the first and second embodiment, a generally rectangular reaction plate 28s is attached to an air bag dispenser assembly 20s along a reaction plate inner edge 34s, as shown in FIGS. 12–15. An outer portion 35s of the reaction plate 28s is outwardly pivotable away from the air bag dispenser assembly 20s by bending the reaction plate 28s along a hinge line 36s extending parallel to the reaction plate inner edge 34s. Prior to air bag inflation, the reaction plate 28s is bent at the hinge line 36s approximately 85° downward from horizontal. Following air bag inflation, the reaction plate 28s is bent approximately 85° upward from horizontal.

Each flexible tether 50s, 51s has a length extending between first and second tether ends, representatively shown at 156 and 158, respectively, in FIGS. 12 and 13. The first and second tether ends 156, 158 of each flexible tether 50s, 51s are fastened to the air bag dispenser assembly 20s adjacent the reaction plate inner edge 34s forming tether loops as shown in FIGS. 12 and 13. A portion 160 of the first flexible tether 50s slidably engages the outer portion 35s of the reaction plate 28s. Likewise, a corresponding portion of the second flexible tether 51s slidably engages the outer portion 35s of the reaction plate 28s at a point spaced laterally from the point where the first flexible tether 50s engages the outer portion 35s of the reaction plate 28s.

As shown in FIGS. 12 and 13, the first flexible tether 50s slidably extends through a first opening or slot 168 in the outer portion 35s of the reaction plate 28s adjacent a reaction plate outer marginal edge 32s. Likewise, the second flexible tether 51s slidably extends through a second slot, spaced laterally from the first slot along the reaction plate outer marginal edge 32s.

According to the fourth embodiment, when the air bag inflates, it forces the outer portion 35s of the reaction plate 28s to bend outward and upward around the horizontal hinge line 36s. The outer portion 35s of the reaction plate 28s will then continue pivoting, due to angular momentum acquired from air bag deployment, into a position angularly spaced from the air bag deployment path and more than 45 degrees from its position before air bag deployment. The angularly spaced position of the outer portion 35s of reaction plate is best shown in FIGS. 13 and 15. As the reaction plate 28s pivots outward, it concentrates the inflation force along a lower edge portion 120s of the frangible door edge 18s. This begins tearing that advances around the entire door edge 18s and separates the door 16s from the vehicle dash panel 12s. Similar to the third embodiment, the first and second tethers 50s, 51s of the fourth embodiment connect the door 16s to the reaction plate 28s to decelerate and prevent the door 16s from flying free.

Unlike the third embodiment, however, the tethers 50s, 51s of the fourth embodiment allow the door 16s to slide along a portion of their lengths. The sliding prevents the loads exerted by door 16s on the tethers 50s, 51s from concentrating at any one attachment point along the tethers 50s, 51s. The sliding also spreads the door arresting shock over time, reducing the probability of the door 16s fracturing or pulling loose from the tethers 50s, 51s.

Although air bag inflation eventually causes the door to tear free along an upper edge portion 44s of the door perimeter 18s, the upper edge portion 44s initially acts as a living hinge. The door 16s initially swings outward and upward about the upper edge portion 44s while remaining in direct contact with the reaction plate 28s.

During this initial opening swing, the plate 28s and the door 16s pivot around different axes because the upper edge portion 44s is offset from the reaction plate hinge line 36s. Because the upper edge 44s and hinge line 36s are offset, and because the tethers 50s, 51s are slidably engaged with the plate 28s and the door 16s, the tethers 50s, 51s are able to hold the plate 28s and door 16s in close proximity to one another without arresting or overly restricting their movement.

The tethers 50s, 51s offer little resistance from the time the door 16s is initially forced open until the door 16s and reaction plate 28s reach an approximately horizontal position. However, when the reaction plate 28s reaches this horizontal position, the door 16s tears loose from the upper edge 44s and is arrested by the tethers 50s, 51s. As the reaction plate 28s moves through the horizontal and continues to swing upward toward its fully open near-vertical position, the reaction plate 28s rapidly decelerates. As the reaction plate 28s decelerates, the tethers 50s, 51s allow the door 16s to swing upwards, absorbing energy as the tethers 50s, 51s slide through the slots 168, 170 in the reaction plate and through the gap between the horizontal strap 126 and the door 16s.

Preferably, the tethers 50s, 51s and horizontal strap 126 are both made of nylon fabric. However, any one of a number of other suitable materials may be used to construct the tethers 50s, 51s and/or the strap 126, to include thin metal straps. In addition, a slotted insert may be used, in place of a strap, to slidably retain the tethers 50s, 51s. In other words, the tethers 50s, 51s; strap 126; reaction plate 28s; door 16s; and offset pivot points 36s, 44s make up a compound-swing tether system that eliminates lash and absorbs door opening forces.

Other possible variations on the fourth embodiment include the strap 126 being made of some flexible material other than fabric. Moreover, the strap 126 need not be flat, but may be of any cross-sectional shape, e.g., a cord-like structure having a circular cross-section. The reaction plate 28s and/or tether ends 156, 158 could be attached to the vehicle panel 12s rather than the air bag dispenser 20s along the reaction plate inner edge 34s. In addition, in other embodiments the tethers 50s, 51s need not slidably engage the reaction plate 28s. Instead, the tethers 50s, 51s may be fixed to the reaction plate 28s at some point along their respective lengths.

Figure 18:
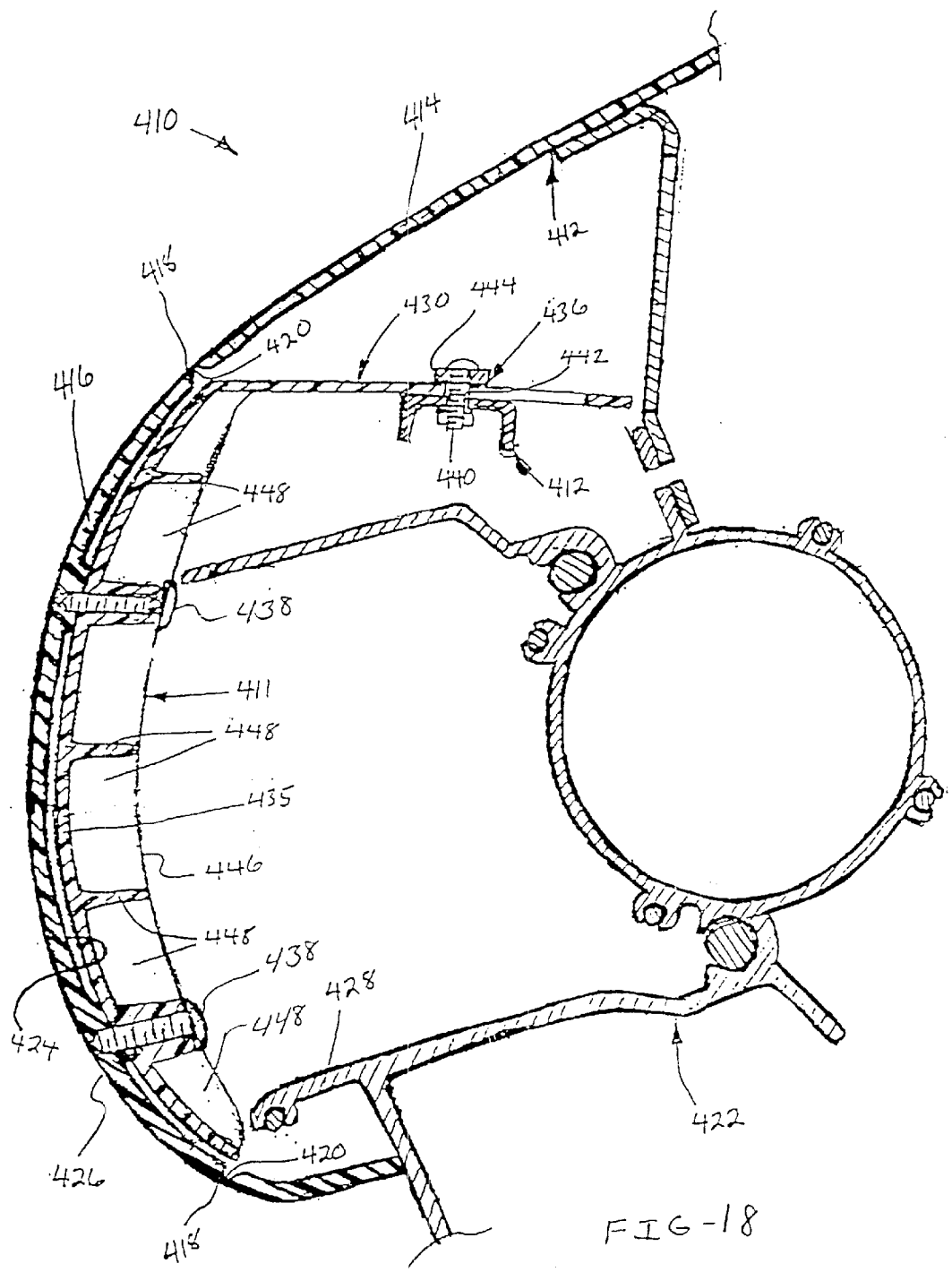
FIG. 18 is a cross-sectional view of a fifth passive restraint system constructed according to the present invention.

An inflatable restraint assembly for passengers in automotive vehicles having a reaction plate constructed of plastic, preferably via injection molding, is generally indicated at 410 in FIG. 18. The reaction plate is generally indicated at 411 in FIGS. 18 and 19. An inflatable restraint assembly having an alternative reaction plate attachment means is generally indicated at 410' in FIG. 20. The reaction plate is generally indicated at 411" in FIGS. 20 and 21. Reference numerals annotated with a prime symbol (') in FIGS. 20 and 21 indicate alternative configurations of elements that also appear in the embodiment of FIGS. 18 and 19. Where a portion of the description uses a reference numeral to refer to the figures, we intend that portion of the description to apply equally to elements designated by primed numerals in FIGS. 20 and 21.

Figure 19:
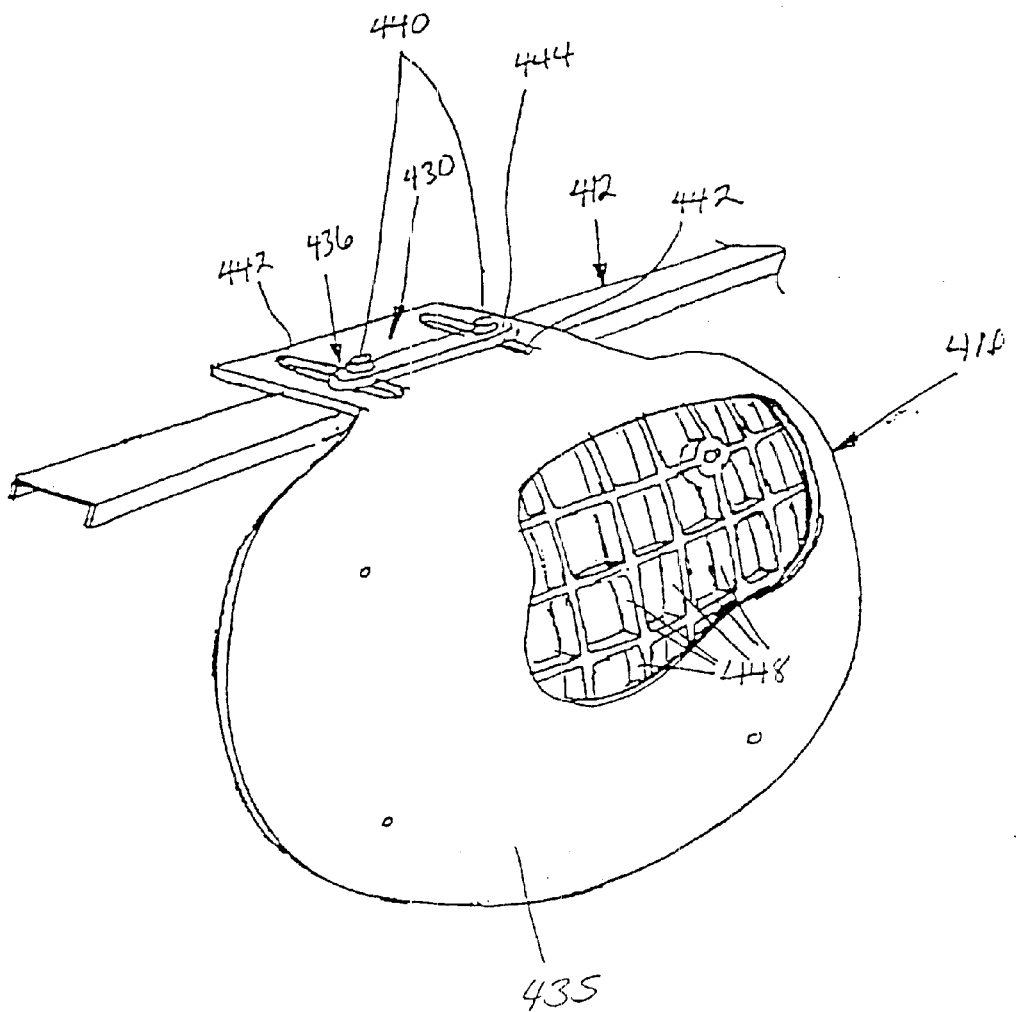
FIG. 19 is a perspective view of a reaction plate of the passive restraint system of FIG. 18.

The assembly 410 includes a support structure generally indicated at 412 in FIGS. 18 and 19. The support structure 412 includes an interior vehicle panel shown at 414 in FIG.

18, and an air bag deployment door shown at 416 in FIG. 18. The air bag deployment door 416 is integrally formed in the panel 414 and includes a perimeter 418, at least a portion of which is defined by a frangible marginal edge or tear seam 420. The support structure 412 also includes an air bag dispenser shown at 422 in FIG. 18. The air bag dispenser 422 is supported adjacent a door inner surface 424 opposite a door outer surface 426. An air bag (not shown) is supported in an air bag receptacle or canister 428 of the air bag dispenser 422. The air bag has an inner end operatively connected to the air bag dispenser 422 and an outer end disposed adjacent the air bag deployment door 416.

The reaction plate 411 is disposed between the air bag and the air bag deployment door 416 and is configured to receive the force of air bag deployment from the air bag dispenser 422 and to direct and distribute that force against the door inner surface 424 to at least partially separate the door 416 from the vehicle panel 414 along the frangible marginal edge 420 of the door 416. The reaction plate 411 has an integral tether 430 connected between the support structure 412 and an outwardly pivotable panel portion 435 of the reaction plate 411. The tether 430 is configured to bend under the force of air bag inflation allowing the pivotable panel portion 435 to pivot into a position angularly spaced from the air bag deployment path.

The reaction plate 411 may be molded from a thermoplastic elastomer (TPE) to enable the reaction plate 411 to meet cold performance requirements. The use of TPE allows the reaction plate 411 to meet these standards because TPE's are generally more ductile and have a lower flexural modulus at low temperatures or have lower glass transition temperatures ($T_g$) than the plastics used for the panel 414. However, in other embodiments the reaction plate 411 may be made of any one of a number of other suitable thermoplastic or thermoset plastics known in the art.

The integral tether or hinge 430 may be connected to the support structure 412 by a sliding hinge 436. The sliding hinge 436 is configured to allow the reaction plate 411 to slide outwardly (rearwardly in the case of a dash-mounted assembly when a deploying air bag forces the reaction plate 411 to pivot outward. Because it allows the reaction plate 411 to move outward as it pivots upward, the sliding hinge 436 moves the reaction plate 411 into a position where it will not bind mechanically against a portion of the vehicle panel 414 that is disposed directly above and in the path of the opening reaction plate 411.

The integral tether 430 may be connected to the support structure 412 by two fasteners 440 and a washer 444. The sliding hinge 436 includes two slotted fastener holes 442 in the integral hinge 430 to receive the fasteners. The slotted fastener holes 442 are configured to slidably receive the shaft portions of each fastener 440. When a deploying air bag impacts an inner or back surface 446 of the reaction plate 411 and begins pushing the reaction plate 411 and door 416 outward, the slotted fastener holes 442 allow the integral tether 430 to slide outwardly relative to the fasteners 440.

The pivotable panel portion 435 of the reaction plate 411 may include integral ribs shown at 448 in FIGS. 18 and 19. The integral ribs 448 are configured to stiffen the reaction plate 411 against deformation caused by uneven impact forces from a deploying air bag. The integral ribs 448 extend integrally inward from an inner surface of the pivotable panel portion 435 of the reaction plate 411. As is best shown in FIG. 19, the integral ribs 448 include vertical and horizontal intersecting ribs in a rectangular matrix or egg crate pattern.

Figure 20:
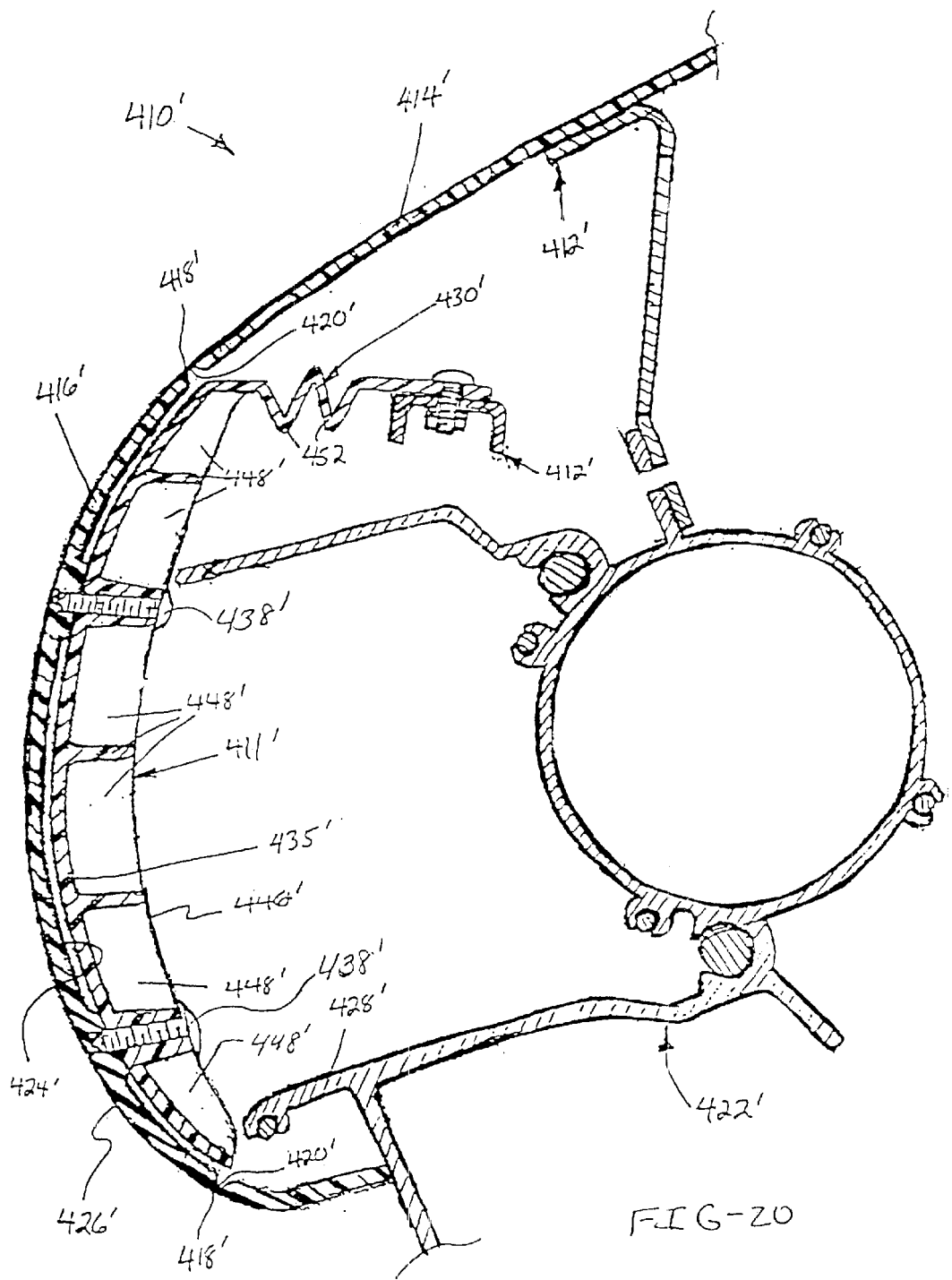
FIG. 20 is a cross-sectional view of a sixth passive restraint system constructed according to the present invention.
Figure 21:
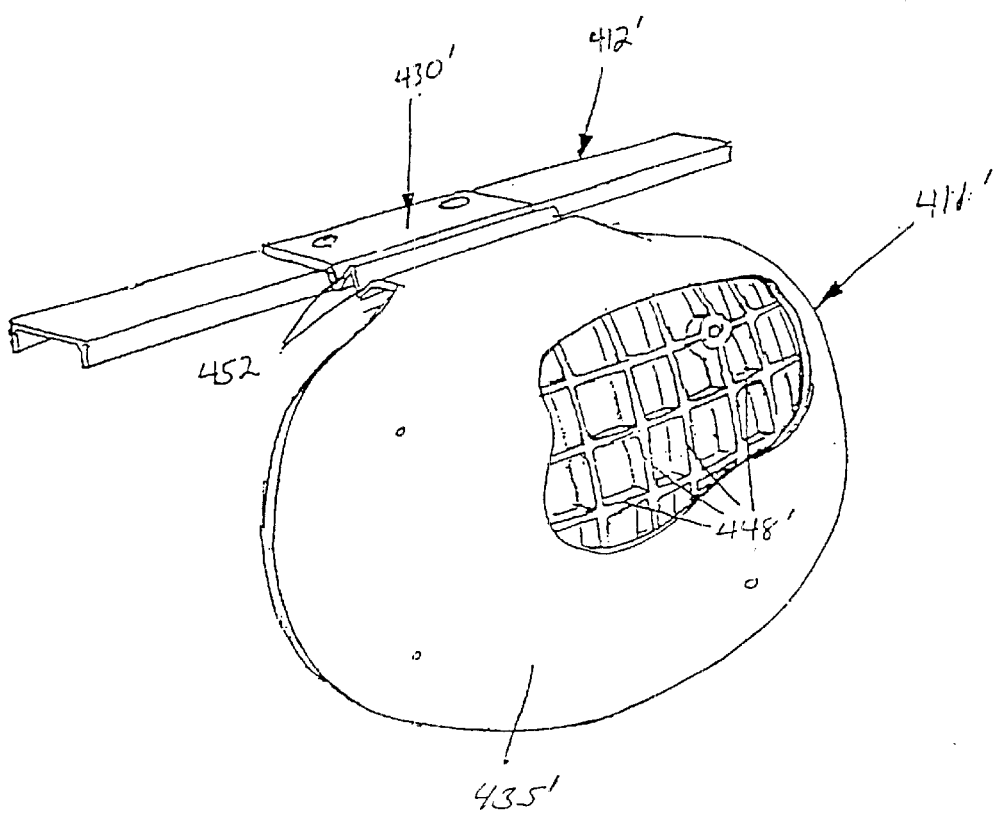
FIG. 21 is a perspective view of a reaction plate of the passive restraint system of FIG. 20.

According to the embodiment of FIGS. 20 and 21, the integral tether 430' includes fanfolds 452 configured to allow the tether 430' to elongate when a deploying air bag forces the reaction plate 411' outward (again, rearward in the case of a dash-mounted assembly). The fanfolds 452 may be integrated into the molding of the reaction plate 411' thus eliminating the mechanical bind described above with regard to the embodiment of FIGS. 18 and 19, without having to form and assemble a sliding mechanism such as that shown in the embodiment of FIGS. 18 and 19. In other embodiments, the tether 430 may include an accordion or bellowstype configuration similar to the fanfolds 452 described above.

In contrast to the discussion in the first embodiment, the pivotable panel portions 435, 435' of the plastic reaction plates 411, 411' are preferably attached to air bag deployment doors 416, 416', as illustrated by screws 438. Also, in contrast to the discussion in the second embodiment, the pivotable panel portions 435, 435' of the plastic reactions plates 411, 411' preferably do not prevent the air bag deployment doors 416, 416' from returning to their original position after air bag deployment. Rather, after air bag deployment, plastic reaction plates 411, 411' preferably return substantially to their pre-deployment positions, thus preventing a vehicle occupant from impacting air bag dispenser 422, 422' in the case of a second collision or impact after air bag deployment and deflation. Also preferably, air bag deployment doors 416, 416' are attached to pivotable panel portions 435, 435' of reaction plates 411, 411' in order to also return substantially to their pre-deployment positions after air bag deployment for the same reasoning as above. A plastic reaction plate is better suited to return the pivotable panel portions 435, 435' and doors 416, 416' to their pre-deployment positions as compared to a metal reaction plate as the plastic reaction plate undergoes more elastic deformation with less permanent deformation than a metal reaction plate.

Figure 22:
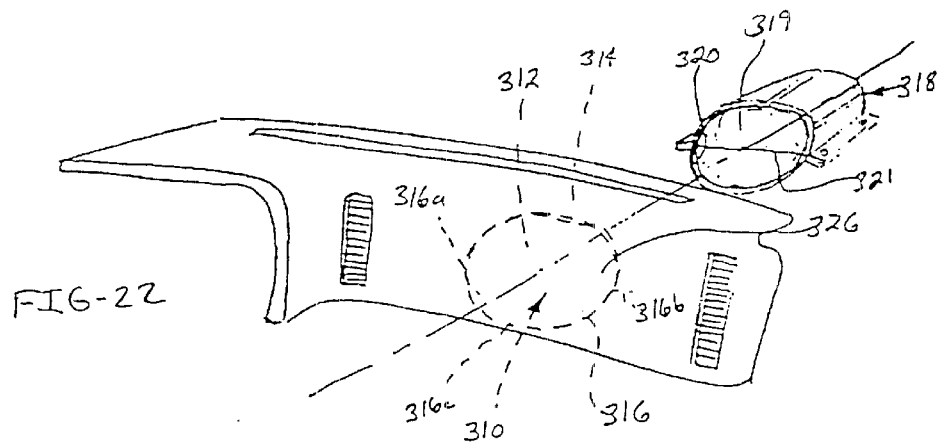
FIG. 22 is a perspective view of a seventh passive restraint system constructed according to the present invention.
Figure 23:
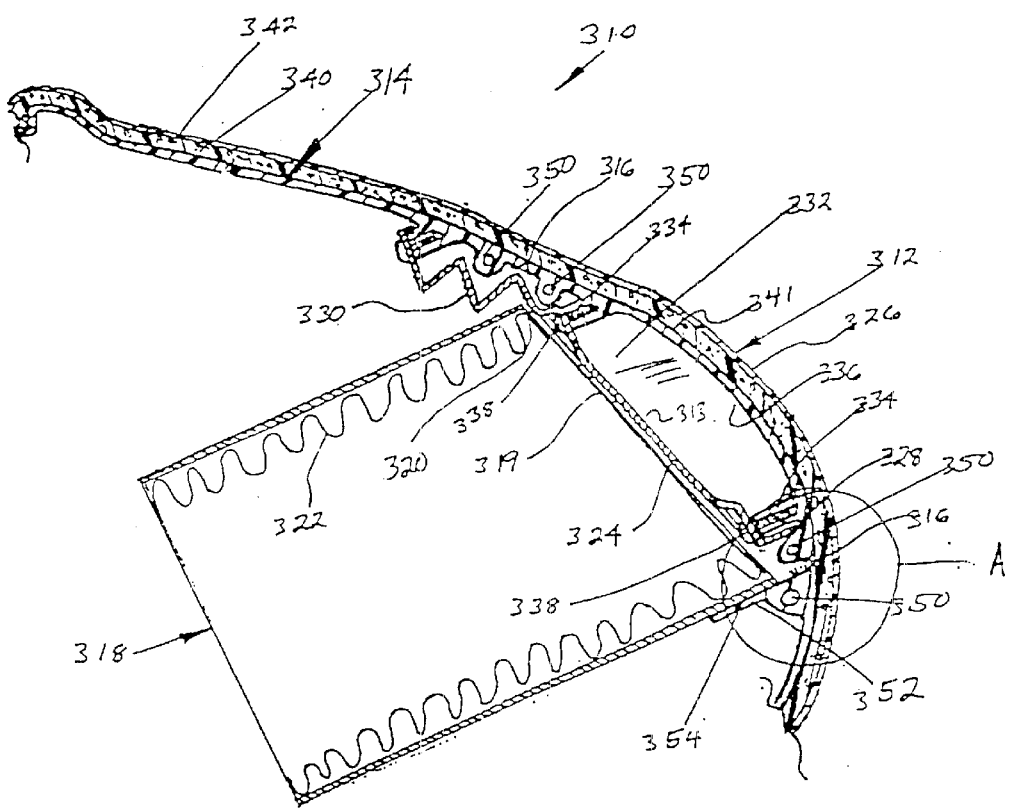
FIG. 23 is a cross-sectional view of the passive restraint system of FIG. 22.
Figure 24:
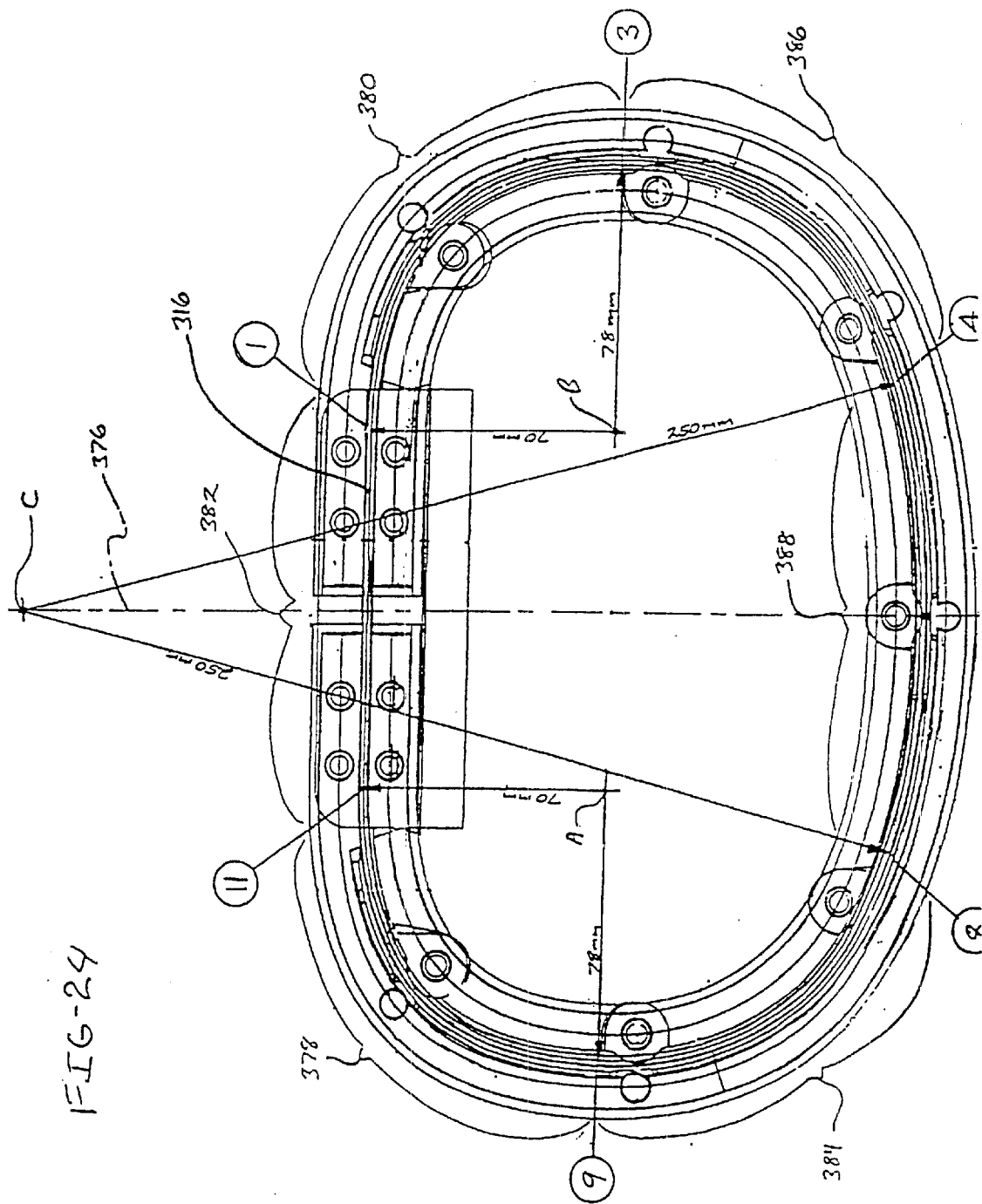
FIG. 24 is a rear view of the air bag door and tear seam pattern of the passive restraint system of FIG. 22.

Another inflatable restraint assembly embodiment, generally shown at 310 in FIGS. 22–24, includes a 360° tear seam 316 bounded by tubular channels 350. Yet another inflatable restraint assembly embodiment, generally shown at 310" in FIG. 25, includes a 270° tear seam 316" bounded by tubular channels 350". Reference numerals annotated with a double-prime symbol (") in FIG. 25 indicate alternative configurations of elements that also appear in the embodiment of FIGS. 22–24. Where a portion of the description uses a reference numeral to refer to the figures, we intend that portion of the description to apply equally to elements designated by double-primed numerals in FIG. 25.

The assembly 310 comprises an air bag door generally indicated at 312 in FIG. 23. The air bag door 312 is integrally formed in a trim panel portion generally indicated at 314 in FIG. 23. The air bag door 312 and trim panel 314 are preferably formed together as a single unitary piece by injection molding. The weakened area or tear seam in the panel, shown at 316 in FIGS. 22 and 23, defines at least a portion of the outline of the air bag door 312. The tear seam 316 is configured to help guide tearing and/or breakage under the force of air bag inflation. The tear seam 316 is formed in an inner surface of the panel 314 to provide an air bag door 312 that is hidden from the view of vehicle occupants. In other embodiments, the tear seam 316 or a styling line may be included on an outer surface of the panel 314.

An air bag dispenser, generally indicated at 318 in FIGS. 22 and 23, is supported behind the air bag door 312 and has a dispenser opening 320 directed toward and facing the air tag door 312. In a preferred embodiment, the dispenser 318 is an aluminum extrusion. A cover 319 with a center break 321 covers the dispenser opening 320. The cover 319 protects an air bag 322 stored in the dispenser 318. The configuration enables the air bag 322 to deploy through the door 312 from within the dispenser 318 when inflated in a known manner. The air bag door 312 is shaped to approximate the shape of the air bag dispenser opening 320 to preclude interference between the deploying air bag 322 and inner edges of the openings created in the panel 314 when the air bag door 312 is forced open. The air bag 322 will at least initially retain the general shape of the dispenser opening 320 that the air bag 322 is deploying from. Therefore, the air bag 322 is less likely to get caught on the inner edges of the air bag door opening because the opening has the same shape as the dispenser opening 320.

The tear seam 316 partially defines an arcuate, cornerless shape for the air bag door 312 as shown in FIGS. 22 and 24. The tear seam 316 is preferably formed by molding but may alternatively be formed by machining using computer numerical control equipment (CNC), laser scoring and the like. The arcuate shape of the door 312 makes tear propagation more predictable by eliminating sharp corners that can be truncated during air bag deployment. In other words, as a crack forms along the tear seam during air bag deployment, rather than negotiate a corner, the crack tends to leave the tear seam and propagate across or "cut off" the corner. The severed corner may either remain attached to the surrounding material or may break free. More specifically, in the case of a rectangular shaped door, corners are "cut-off" and may fail to tear out when a tear seam fracture propagates horizontally outward from the center of a horizontal tear seam at the forward edge of the door, toward the lower corners of the door then leaves that tear seam and "cuts the corner" to an adjacent vertical tear seam instead of continuing to propagate along the horizontal tear seam and all the way around the corner to the vertical tear seam. Through experimentation it has been determined that a tear seam corner having a radius of 13 mm or less will typically fail, i.e., be "cut-off", in deployments at or below –40° F. It has also been found that corner having radii of 20 mm or greater generally is less apt to fail at –40° F.

As best shown in FIG. 24, the tear seam 316 describes a symmetric arcuate path having a vertical line of symmetry shown at 376. The tear seam 316 is essentially cornerless. At no point along the tear seam 316 is there a curve having a radius less than 70 mm. In other words, no incremental length of the tear seam 316 has a cure defined by a radius of less than 70 mm. In other embodiments, any portion of any of the curves defining the tear seam 316 may be defined by radii of considerably less than 70 mm so long as they are not less than the 13 mm value at which tear seam curves have been found to fail at temperatures below –40° F. Optimally, to insure a margin of safety, no portion of any curve should be defined by a radius of less than 20 mm. Another way to express this is to say that, at no point along any curve defining the tear seam 316 should the rate of change of the slope of that curve be permitted to exceed that of a 20 mm diameter circle.

Upper left 378 and upper right 380 portions of the tear seam 316, extending between approximate 9 and 11 o'clock positions and between approximate 1 and 3 o'clock positions of the air bag door 312, respectively, are defined by respective curves that transition in radius from 70 mm at approximate 11 o'clock and 1 o'clock positions, respectively, to 78 mm at approximate 9 o'clock and 3 o'clock positions, respectively. The 70 mm radii, the 78 mm radii and all the transitional radii disposed between those radii are measured from a first center point A for the upper left portion 378 and a second center point B for the upper right portion 380 of the tear seam 316.

An upper mid portion 382 of the tear seam 316, extending between the approximate 11 and 1 o'clock positions, is defined by a generally straight line connecting the upper left 378 and upper right 380 portions of the tear seam 316.

Lower left 384 and lower right 386 portions of the tear seam 316, extending between the 8 and 9 o'clock positions and the 3 and 4 o'clock positions, respectively, are defined by respective others that transition from a radius of 78 mm to a radius of 250 mm. The 78 mm radius is measured from center point A to the approximate 9 o'clock position for the lower left portion 384 and from center point B to the approximate 3 o'clock position of the door 312 seam for the lower right portion 386 of the tear seam 316. The 250 mm radius of the lower left portion 384 is measured from a third center point shown at C in FIG. 24 to an approximate 8 o'clock position of the tear seam 316. Point C is located 88 mm above the upper mid portion 382 of the tear seam 316 along the line of symmetry 376. The 250 mm radius of the lower right portion 386 is measured from the third center point C to an approximate 4 o'clock position of the tear seam 316. Between the 8 and 9 o'clock positions and the 3 and 4 o'clock positions, the lower left and lower right portions 384, 386 follow blend transition curves that are defined by radii that do not have a common center point. More specifically, the 8 and 9 o'clock positions and the 3 and 4 o'clock positions are connected by French curses.

A lower mid portion 388 of the tear seam 316, extending between the approximate 4 and 8 o'clock positions, is defined by curve of constant 250 mm radius from center point C.

As shown in FIG. 24, the orthographic plan view of the tear seam 316 illustrates a tear seam with linear and non-linear portions. Upper mid portion 382 extending between the 11 and 1 o'clock positions is linear, or straight. Continuing clockwise from 1 o'clock, upper right portion 380, lower night portion 386, low mid portion 388, left lower portion 384, and upper left portion 378 are non-linear, or curved. Consequently, 16.7% of tear seam 316 is linear (i.e. 2/12), while 83.3% is non-linear (i.e. 10/12) as shown in an orthographic plan view.

As shown in FIG. 23, a reaction plate 324 is supported behind and is fastened to the air bag door 312, opposite an outer class-A surface 326 of the door 312. The reaction plate 324 preferably is a flat sheet (i.e. without ribs) having an arcuate shape generally matching that of the air bag door 312. At least a portion of an outer peripheral edge 328 of the reaction plate 324 is aligned adjacent the tear seam 316 to help distribute air bag deployment forces along the tear seam 316.

The reaction plate 324 includes an integral extension 330 or tether strap preferably connected to the trim panel 314 at a point adjacent die air bag door 312. The integral extension 330 serves as both a hinge and a tether to the air bag door 312 during air bag deployment.

Preferably a pair of elongated tubular channels, shown at 350 in FIG. 23, are integrally formed by gas-assisted injection molding along either side of the tear seam 316 to further insure that tearing occurs only along the tear seam 316. The tubular channels 350 increase reinforcement and structural rigidity adjacent the tear seam 316, without requiring a large mass of material, which creates a substantial strength differential with the tear seam 316. Because the tubular channels 350 are hollow and do not require a relatively large concentration of material, their formation by injection molding generally does not result in distortions of the outer surface 341 as may otherwise be the case. The use of tubular channels 350 adjacent tear seam 316 has the advantage of providing relatively large tear-guide structures without using large amounts of material to create thick regions that would result in sink formation. If large amounts of material were used to thicken the panel 314 on either side of the tear seam 316, shrinkage during curing could result in surface discontinuities in the form of depressions or "sinks".

As shown in FIG. 23, the tubular channels 350 comprise a tube with an outer shape having a generally semi-circular cross-section and a hollow cavity having generally a circular cross-section. Preferably, the tubular channels 350 extend from the inner or back surface 336 to remain concealed or hidden from the vehicle occupant's view to help conceal the presence of the inflatable restraint system. Preferably one of the tubular channels 350 is formed on the air bag door 312 along a peripheral outer edge of the door 312 and tear seam 316. Preferably, the other of the tubular channels 350 is formed on the trim panel 314 along the tear seam and with a dispenser support bracket 352. The dispenser support bracket 352 is semicircular in front view (not shown) to conform generally to exterior dimensions of a forward lower edge 354 of the dispenser 318. Also preferably, the two tubular channels 350 are disposed adjacent and parallel to one another with the tear seam 316 located in between.

The door 312 includes ribs 332 and bosses 334 integrally extending from a back surface 336 of the door 312 opposite the outer class-A surface 326. However, alternatively, the reaction plate 324 may include ribs extending integrally from an outer surface 313 of the reaction plate 324. (The FIG. 23 drawing is consistent with the ribs 332 extending either outward from the reaction plate 324 outer surface 313 or inward from the door 312 back surface 336.) The reaction plate 324 is spaced from the back surface 336 by the ribs 332 and bosses 334, and is fastened to the door 312 by fasteners 338 extending through the reaction plate 324 and into the bosses 334. Other embodiments may include a tubular channel 360 integrally extending from the back surface 336 of the door 312 and/or the panel 314 and supporting the bosses 334 which integrally extend inward from the tubular channels 360. Also, in other embodiments, the tubular channel 350 that is formed integrally with the door 312 may be formed only 270° with respect to the dispenser 318, i.e., at the sides and bottom of the dispenser opening. This is to concentrate the tearing forces at the sides 316a, 316b and bottom 316c of the tear seam 316 and allow the door 312 to pivot around a hinge formed at a junction of the panel 314 and door 312 upon air bag inflation.

Referring to FIG. 22, the air bag dispenser opening 320 has the same arcuate, generally circular or oval shape as the air bag door 312 to help the stowed air bag 322 to fit through the opening left by the air bag door 312. However, because the air bag 322 expands as it deploys, the air bag door 312 is larger in area than the air bag dispenser opening 320.

A foam layer, as shown at 340 in FIG. 23, may be disposed on and adhered to an outer surface 341 of the panel 314 and door 312. A skin or layer of cover material 342 is disposed over and adhered to an outer surface of the foam layer 340. In other embodiments, the outer surface 341 of the panel 314 and door 312 may also be an outer class-A surface 326 of the panel 314 and door 312, i.e., in hard first surface IP applications having no foam or skin. In some cases, the skin will be weakened along the same outline as tear seam 316.

In the embodiment of FIGS. 22–24, the trim panel 314 that includes the air bag door 312 is an instrument panel. However, in other embodiments, the inflatable restraint assembly may be configured to be mounted in other trim panels such as door panels, quarter panels, etc.

Figure 25:
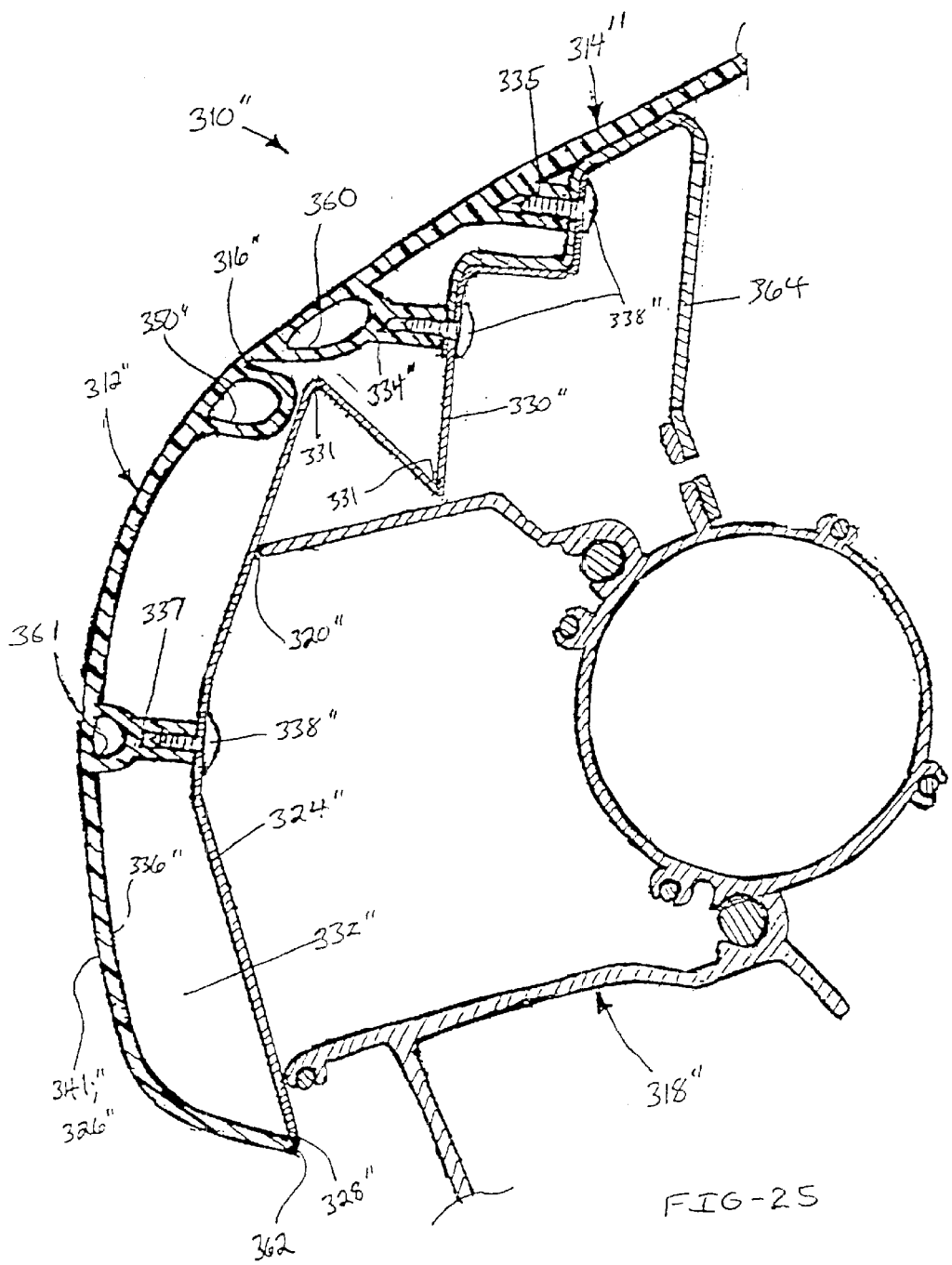
FIG. 25 is a cross-sectional view of an eighth passive restraint system constructed according to the present invention.

According to the embodiment of FIG. 25, the dispenser opening 320" includes no cover 319. Instead, a reaction plate 324" is configured to close the dispenser opening 320". The reaction plate 324" includes an integral extension or tether 330" having fanfolds 331 configured to allow the tether 330" to elongate when a deploying air bag forces the reaction plate 324" outward.

As with the embodiment of FIGS. 22–24, the embodiment of FIG. 25 includes a pair of elongated tubular channels, shown at 350", 360 in FIG. 25. The tubular channels 350", 360 are formed by gas-assisted injection molding along either side of a tear seam 316" that defines an integrally formed door 312" in panel 314". As with the previous embodiment, the tubular channels 350", 360 are included to further insure that tearing is confined to the tear seam 316" when a deploying air bag forces the door 312" to open. As shown in FIG. 25, tubular channel 350" is integrally formed along a peripheral outer edge of the door 312" and tubular channel 360 is integrally formed with the panel 314" in which the door 312" is integrally formed. The tear seam 316" and the pair of tubular channels 350", 360 are formed around approximately. 270° of the door 312", leaving a bottom edge 362 of the door 312 without any tubular channel or tear seam. The bottom edge 362 of the door 312 requires no tear seam as it is also a portion of a bottom edge of the panel 314" and is unattached to any adjacent structures.

A screw boss 334" integrally extends inward from tubular channel 360 and provides one of taco connecting points for the reaction plate tether portion 330" shown in FIG. 25. The second connecting point for the tether 330" is shown at screw boss 335 which integrally extends inward from the panel 314". Screw bosses 334" and 335 also provide connecting points for an upper support bracket shown at 364 in FIG. 25. The embodiment of FIG. 25 also includes an additional tubular channel 361 that integrally extends from the inner surface 336" of the door 312". A third screw boss 337 integrally extends inward from tubular channel 361 and provides a connecting point for the reaction plate 324".

Tubular channels 350, 350", 360 may be further strengthened by at least partially filling the hollow cavity with a reinforcing material, such as polyester resin, epoxy resin, fiber glass, structural spheres, etc. The added strength helps prevent bosses 334, 334", 337 from breaking off during air bag deployment. Further, fasteners 338, 338" may be designed to extend into the reinforcing material and preferably bond with the reinforcing material thus increasing their retention or pullout strength. The reinforcing material may be added to the hollow cavity either before or after fasteners 338, 338" are added to bosses 350, 350", 360.

Figure 26:
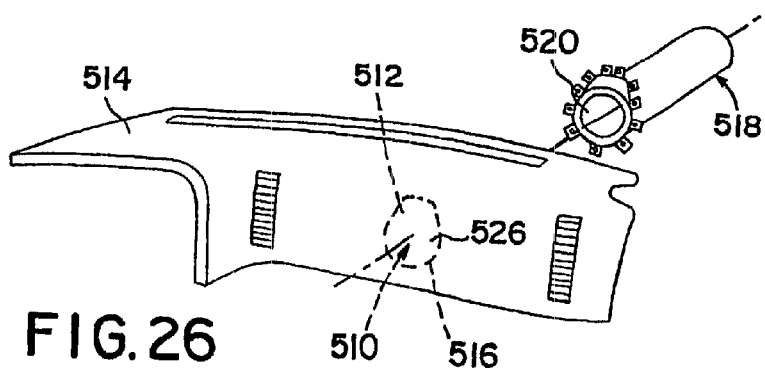
FIG. 26 is a perspective view of a ninth passive restraint system constructed according to the present invention.
Figure 27:
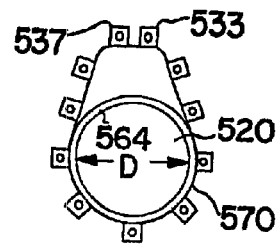
FIG. 27 is a front view of an air bag dispenser of the passive restraint system of FIG. 26.
Figure 28:
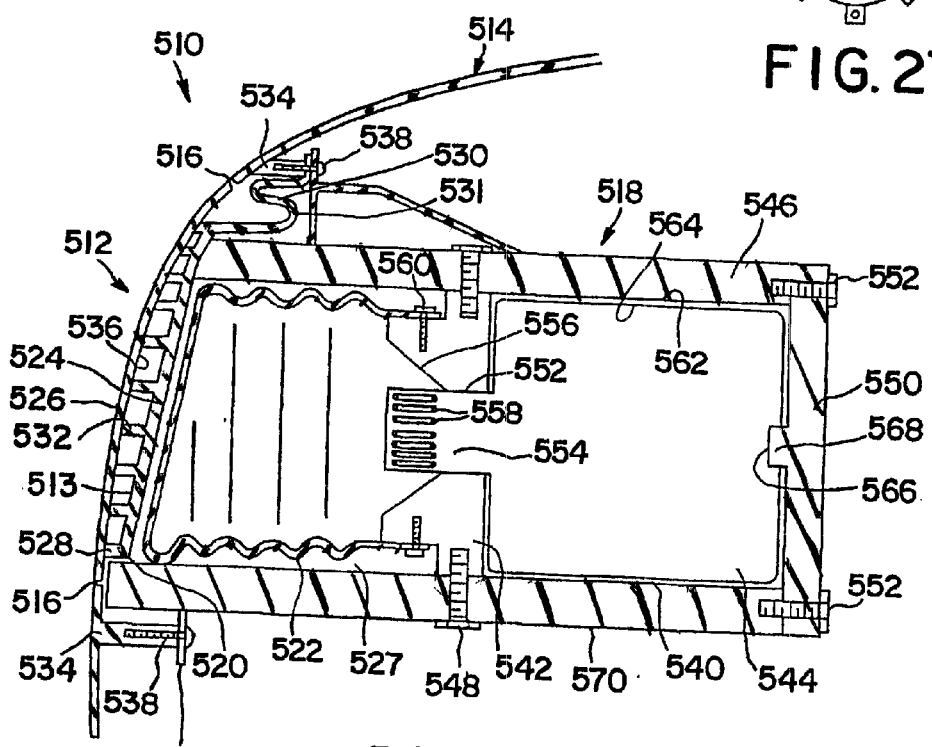
FIG. 28 is a cross-sectional view of the passive restraint system of FIG. 26.

Another inflatable restraint assembly embodiment is shown at 510 in FIGS. 26–28. The assembly 510 comprises an air bag door generally indicated at 512 in FIG. 28. The air bag door 512 is formed as a portion of a trim panel indicated at 514. Preferably, the air bag door 512 and trim panel 514 are formed together as a single unitary piece by injection molding.

A tear seam or frangible marginal edge in the panel, shown at 516 in FIGS. 26 and 28, defines at least a portion of the perimeter of the air bag door 512. As best shown in FIG. 26, the frangible marginal edge 516 at least partially defines an arcuate, cornerless shape for the air bag door 512. The frangible marginal edge 516 is configured to help guide tearing and/or breakage of air bag door 512 from trim panel 514 under the force of air bag inflation. As shown in FIG. 26, air bag door 512 is essentially pear shaped (i.e. having a substantially circular or oval base portion and an elongated upper portion).

Preferably, the frangible marginal edge 516 is formed in an inner surface of the panel portion 514 to provide an air bag door 512 that is hidden or concealed from the view of vehicle occupants. In other embodiments, the frangible marginal edge 516 or a styling line may be included on an outer surface of the panel portion 514. The frangible marginal edge 516 is preferably formed by molding but may alternatively be formed after molding by machining, cutting, routing, laser scoring, etc.

Preferably, the surface area of air bag door 512 as determined by measuring the surface area of outer surface 526 is in the range between and including 5 square inches to 35 square inches (i.e. 5 $in^2$ to 35 $in^2$). While not expressly stated, it should be understood that the above range may be further partitioned in any one square inch increment in between five square inches and thirty-five square inches (i.e. 5 $in^2$, 6 $in^2$, 7 $in^2$, . . . , 35 $in^2$). More preferably, the surface area of air bag door 512 is in the range between and including 12 square inches to 25 square inches (i.e. 12 $in^2$ to 25 $in^2$). Even more preferably, the surface area of air bag door 512 is 18.7 square inches (i.e. 18.7 $in^2$).

An air bag dispenser, generally indicated at 518 in FIG. 26, is supported beneath trim panel 514 adjacent air bag door 512. Air bag dispenser 518 comprises an elongated container 546 mounted with its longitudinal axis substantially perpendicular to air bag door 512. At one end, elongated container 546 comprises a deployment opening 520 directed toward and facing the air bag door 512. At the other end, elongated container 546 preferably comprises a back plate 550 that is preferably attached to elongated container 546 by fasteners 552.

Elongated container 546 also comprises an inflator receptacle 540 and an air bag receptacle 527 for holding inflator 544 and air bag 522, respectively. Inflator receptacle 540 and air bag receptacle 527 of elongated container 546 are preferably partially separated by a collar 542. As shown, collar 542 is attached to container 546 by fasteners 548. However, alternatively, collar 542 may be press fit into container 546 or formed integrally with container 546 thus eliminating fasteners 548. As shown collar 542 comprises an aperture 552 through which outlet end portion 554 of inflator 544 extends. Preferably, collar 542 also comprises a sloped portion 556 that directs inflation gas from ports 558 of outlet end portion 554 of inflator 544 towards and into air bag 522. Also preferably, collar 542 comprises fasteners 560 which attach air bag 522 to the collar 542. However, alternatively air bag 522 may be attached to any portion of dispenser 518 including elongated container 546.

As shown, inflator 544 is retained in inflator receptacle 540 by back plate 550, however, numerous designs may be employed to retain inflator 544 in inflator receptacle 540. Also as shown, the longitudinal axis of inflator 544 is parallel to the direction of air bag 522 inflation which allows the inflator 544 to distribute inflator gas more evenly into the air bag 522 than inflators arranged with their longitudinal axis perpendicular to the direction of air bag deployment.

In use, inflator 544 may be subject to thermal expansion and contraction with changes in ambient temperature and the pressure of the gas contained within. In order to accommodate the effects of thermal expansion and contraction, inflator 544 may be supported about one or, preferably, both ends such that at least a portion of die outer surface 562 of the inflator 544 does not contact inner surface 564 of elongated container 546. As shown, at one end outlet end portion 554 of inflator 544 is supported within aperture 552. At the other end, a recess 566 in the base of inflator 544 is supported by a projection 568 in back plate 550.

As shown, air bag 522 is supported in an air bag receptacle 527 of the air bag dispenser 518. The air bag 522 has an inner end connected to the air bag dispenser 518 and an outer end disposed adjacent the air bag door 512. Preferably, air bag 522 has a volume sufficient to protect passenger-side (i.e. non-driver) front-seat occupants in the event of a vehicle front-end collision. As such, the volume of air bag 522 is preferably of at least 90 liters. More preferably, the volume of air bag 522 is at least 115 liters. With regards to an upper limit, air bag 522 is only constrained by the size of air bag receptacle 527 and the type of air bag 522 materials used. In other words, as air bag 522 materials progress, it is expected that the packaging of equivalent sized air bags 522 will decrease. In any event, based on current air bag 522 materials, the air bag receptacle 527 of the current invention should be adaptable to accommodate air bags 522 having volumes of approximately 250 liters, though current protection criteria dictates that an air bag volume of 145 liters is generally sufficient. While not expressly stated, it should be understood that the 90 liter air bag 522 volume identified above may be further increased in one liter increments (i.e. 90 1, 91 1, 92 1, etc.). It should also be understood that the 90 liter air bag 522 may actually decrease if such is found to adequately protect passenger-side front-seat occupants.

Preferably, dispenser 518 is attached to trim panel 514 by fasteners 538 extending through the apertures 533 of attachment points 537 on the outer surface 570 of dispenser 518. Preferably, dispenser 518 is attached to trim panel 514 by a series of attachment points 537 creating a pattern around air bag door 512. While not shown, attachment points 537 may also be used to secure the dispenser 518 to other support structure including the chassis, cross-car beam, firewall or any other suitable member.

While FIG. 27 shows the inner surface 564 and the outer surface 570 of elongated container 546 to be circular, in other embodiments, the inner surface 564 and outer surface 570 may be substantially circular with one or more flat surfaces to facilitate assembly of the dispenser 518 or attachment of the dispenser 518 to support structure. For example, inner surface 564 may comprise one or more flat surfaces in conjunction with collar 542 to prevent collar 542 from rotating in the elongated container 546 during assembly with fasteners 548. Outer surface 570 may comprise one or more flat surfaces to better facilitate attachment of the dispenser 518 to the support structure given that it is generally easier to attached flat surfaces than radial surfaces. Within the scope of the invention, where numerous flat surfaces are employed, inner surface 564 and/or outer surface 570 may take the shape of a hexagon, octagon, or other polygon.

Air bag dispenser 518 has a deployment opening 520 directed toward and facing the air bag door 512. Preferably air bag deployment opening 520 is shaped to approximate a slightly smaller shape of the air bag door 512 to preclude interference between the deploying air bag 522 and inner edges of the openings created in the panel 514 when the air bag door 512 is forced open. The air bag 522 will at least intially retain the general shape of the deployment opening 520 that the air bag 522 is deploying from. Therefore, the air bag 522 is less likely to get caught on the inner edges of the panel 514 because air bag deployment opening 520 is shaped to approximate a slightly smaller shape of the air bag door 512.

In the case where deployment opening 520 is circular, preferably, deployment opening 520 has a diameter D in the range between and including 6.5 inches to 2.5 inches. Using the formula of $A=\pi r^2$ (where A=area and r=D/2), this results in an area of 33.2 square inches to 4.9 square inches (i.e. 33.2 in$^2$ to 4.9 in$^2$). While not expressly stated, it should be understood that the above range for diameter D may be further expressed any 0.25 inch increment in between 6.5 inches to 2.5 inches. More preferably, deployment opening 520 has a diameter D in the range between and including 5.5 inches to 3.5 inches which results in an area of 23.8 square inches to 9.6 square inches (i.e. 23.8 in$^2$ to 9.6 in$^2$). Even more preferably deployment opening 520 has a diameter D of 4 inches which results in an area of 12.6 square inches (i.e. 12.6 in$^2$).

Air bag dispenser 518 may be formed from metal such as aluminum using an extrusion process, or steel using a sheet metal rolling process. Alternatively, air bag dispenser 518 may be formed from a plastic material and more preferably a thermoplastic material formed from an extrusion process. Where air bag dispenser 518 is made of thermoplastic, it may be welded to the inner surface 536 of air bag door 512 or trim panel 514 to attach dispenser 518 to the trim panel 514, thus eliminating attachments 537 attached to dispenser 518 and certain fasteners 538 and bosses 534. Alternatively air bag dispenser 518 may be attached to the inner surface 536 of air bag door 512 or trim panel 514 by an adhesive.

Air bag door 512 preferably includes a tether 530 attached to the inner surface 536 of air bag door 512, as well as a support structure adjacent air bag door 512, such as trim panel 514 or air bag dispenser 518. As shown, tether 530 is attached to trim panel 514. However, tether 530 may be attached to any support structure suitable to retain air bag door 512 from breaking free and entering the passenger compartment upon deployment. Preferably, tether 530 is attached to air bag door 512 by any means known in the art including welding, adhesive, or fasteners.

Preferably, tether 530 serves as both a hinge and a tether to the air bag door 512 during air bag deployment. Tether 530 may be of any design or materials known in the art including, but not limited to, metal (e.g. steel straps, steel mesh screen), plastics (e.g. themoplastics, themoset plastics, elastomers, plastic mesh screen,) and fibers (e.g. nylon straps, PVC coated nylon scrim, hemp, cotton, woven or nonwoven). Where tether 530 comprises a plastic, preferably the plastic for tether 530 has a lower glass transition temperature (Tg) or lower flexural modulus that the plastic material used for trim panel 514.

Preferably tether 530 includes fanfolds 531 configured to allow tether 530 to elongate when a deploying air bag forces the reaction plate 524 outward. The fanfolds 531 provide outward motion that prevents the pivotable panel portion from binding against the upper edge of the air bag deployment door opening during air bag deployment.

As shown in FIG. 28, preferably a reaction plate 524 is located between the inner surface 536 of air bag door 512 and air bag 522. Reaction plate 524 is configured to receive the force of air bag deployment from the air bag dispenser 518 and to direct and distribute that force against the inner surface 536 of air bag door 512 to separate the air bag door 512 from the trim panel 514 along frangible marginal edge 516. Also preferably, the reaction plate 524 has a contour generally matching that of inner surface 536 of air bag door 512. Also preferably, at least a portion of an outer peripheral edge 528 of the reaction plate 524 is aligned adjacent the frangible marginal edge 516 to help distribute air bag deployment forces along the frangible marginal edge 516.

Also preferably, the reaction plate 524 comprises a plastic material and, more preferably, a thermoplastic elastomer formed using injection molding. Also preferably, the reaction plate 524 may include ribs 532 extending integrally from an outer surface 513 of the reaction plate 524 towards inner surface 536 of air bag door 512.

Also preferably, a portion of the reaction plate is attached to the inner surface 536 of air bag door 512, as well as a support structure adjacent air bag door 512, such as trim panel 514 or air bag dispenser 518. Preferably, reaction plate 524 is attached to air bag door 512 by welding (e.g. vibration, ultrasonic), for example, ribs 532 to the inner surface 536 of air bag door 512. Alternatively, reaction plate 524 may be attached to air bag door 512 by an adhesive or fasteners. With regards to the support structure, preferably reaction plate 524 may be attached to trim panel 514 by fasteners 538 (e.g. screws) extending through the reaction plate 524 and into the bosses 534.

Also preferably, as shown, reaction plate 524 and tether 530 comprise a single member, preferably formed at the same time and from the same material. However, separate members are contemplated within the scope of the invention. In other embodiments, reaction plate 524 and/or a tether 530 may be provided with air bag dispenser 518, as a single assembly, for attachment to trim panel 514 and the other support structures.

In the embodiment of FIGS. 26–28, the trim panel that includes the panel 514 and door 512 is an instrument panel. However, in other embodiments, the inflatable restraint assembly may be configured to be mounted in other trim panels such as door panels, quarter panels, etc. In other embodiments, a foam layer may be disposed on and adhered to an outer surface 526 of the panel 514 and door 512. Also, a skin or layer of cover material may be disposed over and adhered to an outer surface of the foam layer. In some cases, the skin will be weakened along the same outline as frangible marginal edge 516.

The description and drawings illustratively set forth our presently preferred invention embodiments. We intend the description and drawings to describe these embodiments and not to limit the scope of the invention. Obviously, it is possible to modify these embodiments while remaining within the scope of the following claims. Therefore, within the scope of the claims, one may practice the invention otherwise than as the description and drawings specifically show and describe.

We claim:

1. An inflatable restraint apparatus for an automotive vehicle, the apparatus comprising:

an interior vehicle panel;

an air bag deployment door integrally formed in the vehicle panel, the air bag deployment door having a perimeter, at least a portion of the perimeter defined by a frangible marginal edge;

an air bag dispenser supported behind a door inner surface;

an air bag supported in an air bag receptacle of the air bag dispenser; and a reaction plate disposed between the air bag and the air bag deployment door, the reation plate connected to the air bag deployment door, wherein the door has a predeployment position before a deployment of the air bag, and the reaction plate returns the door substantially towards the predeployment position after the deployment of the air bag.

2. An inflatable restraint apparatus as defined in claim 1 in which the reaction plate material comprises a plastic material.

3. An inflatable restraint apparatus as defined in claim 2 in which the plastic material comprises a thermoset.

4. An inflatable restraint apparatus as defined in claim 2 in which the plastic material comprises a thermoplastic.

5. An inflatable restraint apparatus as defined in claim 4 in which the thermoplastic comprises a thermoplastic elastomer.

6. An inflatable restraint apparatus as defined in claim 1 in which the vehicle panel comprises a plastic material and the reaction plate comprises a plastic material; and
    wherein the reaction plate plastic material has a lower glass transition temperature than the vehicle panel plastic material.

7. An inflatable restraint apparatus as defined in claim 1 in which the vehicle panel comprises a plastic material and the reaction plate comprises a plastic material; and
    wherein the reaction plate plastic material is more ductile than the vehicle panel plastic material.

8. An inflatable restraint apparatus as defined in claim 1 in which the reaction plate is connected to the air bag deployment door by a fastener.

9. An inflatable restraint apparatus as defined in claim 8 in which the fastener is a threaded fastener.

10. An inflatable restraint apparatus as defined claim 9 in which the threaded fastener is threaded into a boss, the boss extending inward from the air bag deployment door.

11. An inflatable restraint apparatus as defined in claim 1 in which the reaction plate is connected to the air bag deployment door by an adhesive.

12. An inflatable restraint apparatus as defined in claim 1 in which the reaction plate is connected to the air bag deployment door by welding.

13. An inflatable restraint apparatus as defined in claim 1 in which the reaction plate includes a reaction plate panel portion.

14. An inflatable restraint apparatus as defined in claim 13 in which the reaction plate panel portion moves outward from the dispenser with inflation of the air bag; and
    moves toward the dispenser with deflation of the air bag.

15. An inflatable restraint apparatus as defined in claim 13 in which the reaction plate panel portion is configured to receive the force of air bag deployment from the dispenser and to direct that force against the door inner surface to separate the door from the vehicle panel along the frangible marginal edge of the door.

16. An inflatable restraint apparatus as defined in claim 1 in which the reaction plate includes a reaction plate tether portion.

17. An inflatable restraint apparatus as defined in claim 16 in which the reaction plate tether portion is connected to the vehicle panel.

18. An inflatable restraint apparatus as defined in claim 17 in which the reaction plate tether portion is connected to the vehicle panel by a fastener.

19. An inflatable restraint apparatus as defined in claim 18 in which the fastener is a threaded fastener.

20. An inflatable restraint apparatus as defined in claim 16 in which the reaction plate tether portion is connected to a support structure.

21. An inflatable restraint apparatus as defined in claim 1 in which the reaction plate includes a reaction plate panel portion and a reaction plate tether portion.

22. An inflatable restraint apparatus as defined in claim 21 in which the reaction plate tether portion connects the reaction plate panel portion to the vehicle panel.

23. An inflatable restraint apparatus as defined in claim 21 in which the reaction plate tether portion connects the reaction plate panel portion to a support structure.

24. An inflatable restraint apparatus as defined in claim 21 in which the reaction plate tether portion and the reaction plate panel portion are integrally connected.

25. An inflatable restraint apparatus as defined in claim 21 in which the reaction plate panel portion and the reaction plate tether portion comprise a unitary piece.

26. An inflatable restraint apparatus as defined in claim 1 in which the reaction plate includes a marginal outer edge portion having a shape generally identical to and aligned with at least a portion of the frangible marginal edge of the air bag deployment door.

27. An inflatable restraint apparatus as defined in claim 1 in which at least a portion of the reaction plate is disposed adjacent the door inner surface.

28. An inflatable restraint apparatus as defined in claim 1 in which the door and vehicle panel comprise a unitary piece.

29. An inflatable restraint apparatus as defined in claim 1 in which a flexible skin covers at least a portion of the vehicle panel in a layered disposition.

30. An inflatable restraint apparatus as defined in claim 1 in which a foam layer covers at least a portion of the vehicle panel.

31. An inflatable restraint apparatus as defined in claim 1 in which the frangible marginal edge of the door comprises a region of reduced cross sectional thickness of the vehicle panel.

32. Be An inflatable restraint apparatus as defined in claim 1 in which the frangible marginal edge defines the entire air bag deployment door perimeter.

33. An inflatable restraint apparatus as defined in claim 1 in which at least one rib extends integrally inward from an inner surface of the reaction plate.

34. An inflatable restraint apparatus as defined in claim 1 in which the vehicle panel comprises an instrument panel.

35. A method of operating an inflatable restraint apparatus for an automotive vehicle, the method comprising:
    providing an interior vehicle panel;
    providing an air bag deployment door integrally formed in the vehicle panel, the air bag deployment door having a perimeter, at least a portion of the perimeter defined by a frangible marginal edge;
    providing an air bag dispenser supported behind a door inner surface;
    providing an air bag supported in an air bag receptacle of the air bag dispenser; and
    providing a reaction plate disposed between the air bag and the air bag deployment door;
    providing a predeployment position for the air bag deployment door before a deployment of the air bag; and
    returning the air bag deployment door towards the predeployment position after the deployment of the air bag, wherein the reaction plate returns the air bag deployment door substantially towards the predeployment position after the deployment of the air bag.

36. The method of operating an inflatable restraint apparatus of claims 35 in which a portion of the reaction plate moves outward from the dispenser with inflation of the air bag; and
    moves toward the dispenser with deflation of the air bag.

* * * * *